US012696304B2

(12) United States Patent
Palayur et al.

(10) Patent No.: US 12,696,304 B2
(45) Date of Patent: Jul. 28, 2026

(54) WIRELESS DEVICE MANAGEMENT

(71) Applicant: MAXLINEAR, INC., Carlsbad, CA (US)

(72) Inventors: Saju Palayur, Poway, CA (US); Salvador Iranzo Molinero, Betera (ES)

(73) Assignee: MaxLinear, Inc., Carlsbad, CA (US)

( * ) Notice: Subject to any disclaimer, the term of this patent is extended or adjusted under 35 U.S.C. 154(b) by 421 days.

(21) Appl. No.: 18/324,134

(22) Filed: May 25, 2023

(65) Prior Publication Data

US 2023/0389062 A1      Nov. 30, 2023

Related U.S. Application Data

(60) Provisional application No. 63/366,924, filed on Jun. 24, 2022, provisional application No. 63/365,597, filed on May 31, 2022.

(51) Int. Cl.
| | |
|---|---|
| *H04W 72/541* | (2023.01) |
| *H04W 52/18* | (2009.01) |
| *H04W 64/00* | (2009.01) |
| *H04W 72/0453* | (2023.01) |

(52) U.S. Cl.
CPC ......... *H04W 72/541* (2023.01); *H04W 52/18* (2013.01); *H04W 64/00* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 2013/0229931 A1* | 9/2013 | Kim ...................... | H04W 48/16 |
| | | | 370/252 |
| 2020/0367020 A1* | 11/2020 | Ansley ................... | H04W 16/14 |
| 2021/0132234 A1* | 5/2021 | Whitefield .............. | G01S 19/22 |
| 2022/0312513 A1 | 9/2022 | Chitrakar et al. | |
| 2023/0070695 A1 | 3/2023 | Ansley et al. | |
| 2023/0379128 A1* | 11/2023 | Wang ................... | H04W 52/283 |
| 2023/0379840 A1 | 11/2023 | Wang | |
| 2023/0388962 A1 | 11/2023 | Palayur et al. | |

OTHER PUBLICATIONS

Non-Final Office Action for U.S. Appl. No. 18/324,137, dated Jun. 16, 2025, 17 pages.

(Continued)

*Primary Examiner* — Srinivasa R Reddivalam
(74) *Attorney, Agent, or Firm* — Buchalter; Jason W. Croft

(57) ABSTRACT

According to an aspect of an embodiment, an automatic frequency coordination (AFC) server may comprise an AFC database and a processing device. The AFC database may comprise incumbent device data for an incumbent device. The processing device may be configured to determine a mean square error (MSE) value for the incumbent device. The processing device may be configured to compute an interference to noise (I/N) ratio for the incumbent device based on the MSE value for the incumbent device. The processing device may be configured to compute one or more operating frequencies for an access point, wherein the one or more operating frequencies have the I/N ratio of less than a threshold at the incumbent device.

18 Claims, 16 Drawing Sheets

*900*

(56)                    References Cited

OTHER PUBLICATIONS

RACOM s.r.o.—RipEX2—"MSE vs DQ" Retrieved from internet May 23, 2023 <https://www.racom.eu/eng/products/m/ripex/app/mse/mse.html>.

FC news from the Federal Communications Commission FCC Adopts New Rules for The 6 Ghz Band, Unleashing 1,200 Megahertz of Spectrum for Unlicensed Use. Et Docket No. 18-295; GN Docket No. 17-183 Apr. 23, 2020.

Wi-Fi Alliance. 'Wi-Fi 6E: Wi-Fi® in the 6 GHz band.' Jan. 2021.

Wi-Fi Alliance. 'Wi-Fi 6E Insights.' Issue 1, Apr. 2021.

Wi-Fi Alliance. 'Wi-Fi 6E Insights.' Issue 2, Jul. 2021.

Wi-Fi Alliance. 'Wi-Fi 6E Insights.' Issue 3, Oct. 2021.

Wi-Fi Alliance. 'Wi-Fi 6E Insights.' Issue 4, 2021.

Wi-Fi Alliance. 'Wi-Fi 6E Insights.' Issue 5, Apr. 2022.

Wi-Fi Alliance. 'Wi-Fi 6E Insights.' Issue 6, Jul. 2022.

Wi-Fi Alliance. 'Wi-Fi 6E Insights.' Issue 7, Nov. 2022.

Wi-Fi Alliance. 'Wi-Fi 6E Insights.' Issue 8.

Federal Communications Commission "Report and Order and Further Notice of Proposed Rulemaking" ' FCC 20-51. Apr. 24, 2020 ET Docket No. 18-295; GN Docket No. 17-183.

Wi-Fi Alliance. 'Automated Frequency Coordination (AFC).' [retrieved May 23, 2023]. Retrieved from the Internet <URL: https://www.wi-fi.org/downloads-registered-guest/AFC_Specfications_and_Test_Plans_05082023.zip/38132>.

Wi-Fi Alliance. 'AFC System Reference Model' version 1.0 [retrieved May 23, 2023]. Retrieved from the Internet <URL: https://www.wi-fi.org/downloads-registered-guest/AFC_Specfications_and_Test_Plans_05082023.zip/38132>.

Wi-Fi Alliance. 'AFC System to AFC Device Interface Specification' version 1.4.1 [retrieved May 23, 2023]. Retrieved from the Internet <URL: https://www.wi-fi.org/downloads-registered-guest/AFC_Specfications_and_Test_Plans_05082023.zip/38132>.

Wi-Fi Alliance. 'AFC Device (DUT) Compliance Test Plan' version 1.3.3 [retrieved May 23, 2023]. Retrieved from the Internet <URL: https://www.wi-fi.org/downloads-registered-guest/AFC_Specfications_and_Test_Plans_05082023.zip/38132>.

Wi-Fi Alliance. 'AFC System (SUT) Compliance Test Plan' version 1.4.2 [retrieved May 23, 2023]. Retrieved from the Internet <URL: https://www.wi-fi.org/downloads-registered-guest/AFC_Specfications_and_Test_Plans_05082023.zip/38132>.

"Tracking Moving Objects with Tile" tile by Life 360 Retrieved from the Internet May 25, 2023 <https://support.thetileapp.com/hc/en-us/articles/200591638-Tracking-Moving-Objects-with-Tile#:~:text=Your%20Tile%20uses%20Bluetooth%20technology,not%20have%20GPS%20location%20services>.

Final Office Action of U.S. Appl. No. 18/324,137 mailed Jan. 12, 2026, 24 pages.

* cited by examiner

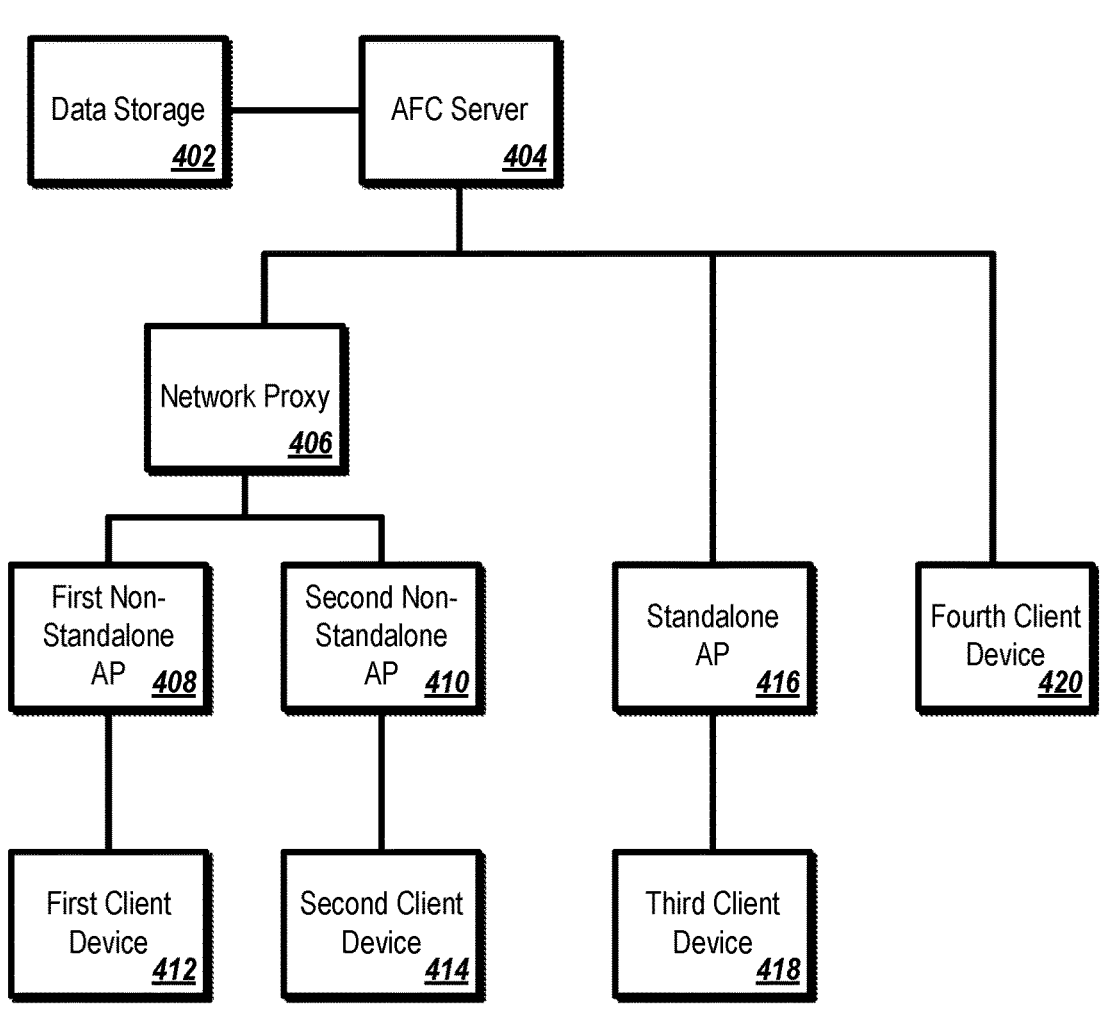
FIG. 4

800 determine a mean square error (MSE) value for the incumbent device          805 compute an interference to noise (I/N) ratio for the incumbent device based on the MSE value for the incumbent device          810 compute one or more operating frequencies for an access point, wherein the one or more operating frequencies have the I/N ratio of less than a threshold at the incumbent device          815

900 access an automatic frequency coordination (AFC) server to compare an AFC database frequency for an incumbent device to an AP operational frequency    905 determine a predicted interference between a transmission from the AP and the incumbent device when the AP operational frequency is used    910 determine a transmit power mode based on the predicted interference    915

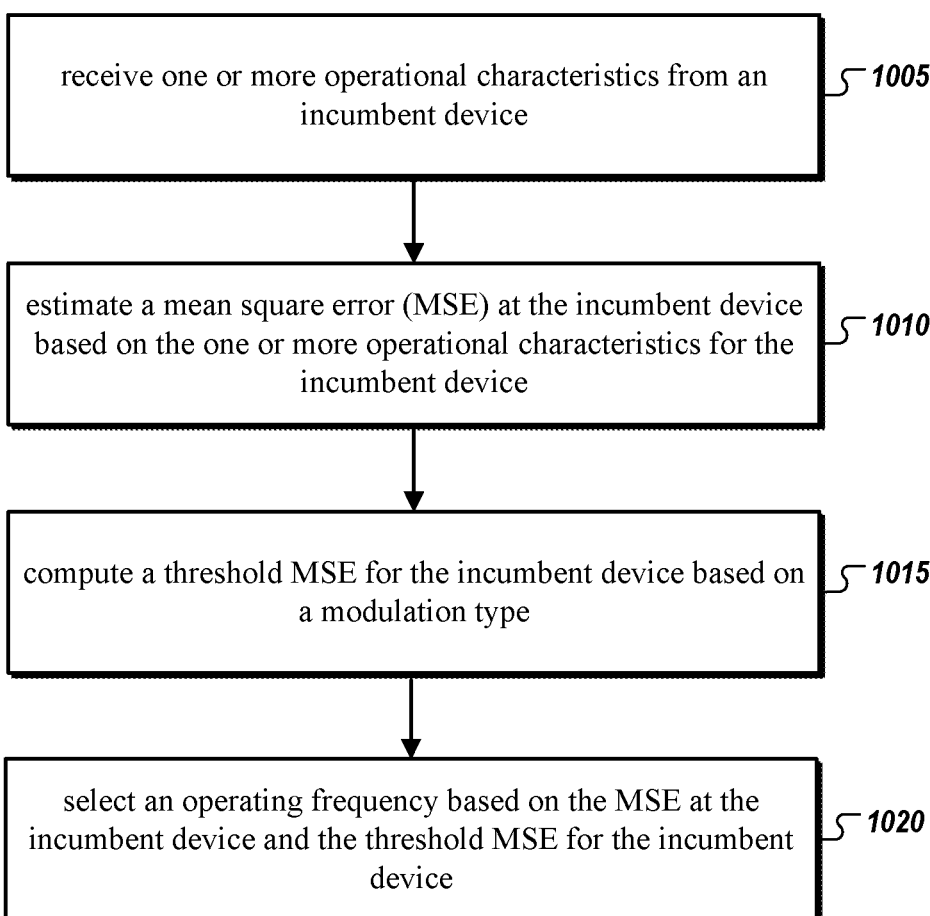

receive one or more operational characteristics from an incumbent device — 1005 estimate a mean square error (MSE) at the incumbent device based on the one or more operational characteristics for the incumbent device — 1010 compute a threshold MSE for the incumbent device based on a modulation type — 1015 select an operating frequency based on the MSE at the incumbent device and the threshold MSE for the incumbent device — 1020

FIG. 10

*1100* determine interference between the AP and one or more incumbent devices ⟋*1105* determine a distance between the AP and the one or more incumbent devices ⟋*1110* determine an AP location based on a location of a close proximity communication device ⟋*1115*

1200 determine a close proximity communication device location  ⌐ 1205 determine a distance between the close proximity communication device and the AP  ⌐ 1210 determine an AP location based on the close proximity communication device location and the distance between the close proximity communication device and the AP  ⌐ 1215

*1300* receive an access point (AP) location from one or more of an AP or a close proximity communication device   ∽ *1305* determine a distance between the AP and the incumbent device   ∽ *1310* determine a transmission power mode permission based on the distance between the AP and the incumbent device   ∽ *1315*

WIRELESS DEVICE MANAGEMENT

RELATED APPLICATION

This application claims the benefit of U.S. Provisional Application No. 63/365,597, filed May 31, 2022 and U.S. Provisional Application No. 63/366,924, filed Jun. 24, 2022, the disclosures of which are incorporated herein by reference in their entirety.

The embodiments discussed in the present disclosure are related to wireless device management, and in particular, to automatic frequency coordination (AFC) systems and enhancements to AFC systems and related receivers.

BACKGROUND

Unless otherwise indicated herein, the materials described herein are not prior art to the claims in the present application and are not admitted to be prior art by inclusion in this section.

Wi-Fi® communications may be configured to occur in multiple frequency bands, including the 2.4 GHz, 5 GHz, and 6 GHz frequency bands. Additionally, some Wi-Fi® communications may be broadcast over different radio links that may include varying operational frequencies. Some incumbent communication systems may also be configured to communicate using the same or similar frequencies as Wi-Fi® communications. In some circumstances, interference between the Wi-Fi® communications and the incumbent communications may occur.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In some embodiments, an automatic frequency coordination (AFC) server may comprise an AFC database comprising incumbent device data for an incumbent device, and a processing device. The processing device may be configured to: determine a mean square error (MSE) value for the incumbent device; compute an interference to noise (I/N) ratio for the incumbent device based on the MSE value for the incumbent device; and compute one or more operating frequencies for an access point. The one or more operating frequencies may have the I/N ratio of less than a threshold at the incumbent device.

In some embodiments, an access point (AP), may comprise a processing device and a transceiver. The processing device may be configured to: access an AFC server to compare an AFC database frequency for an incumbent device to an AP operational frequency; determine a predicted interference between a transmission from the AP and the incumbent device when the AP operational frequency is used; and determine a power mode based on the predicted interference. The transceiver may be configured to: transmit a signal on the AP operational frequency at the power mode, and receive one or more operational characteristics from an incumbent device;

In some embodiments, a computer-readable storage medium may include computer executable instructions. The computer executable instructions, when executed by one or more processors, may cause an AFC server to: estimate an MSE at the incumbent device based on the one or more operational characteristics for the incumbent device; compute a threshold MSE for the incumbent device based on a modulation type; and select an operating frequency based on the MSE at the incumbent device and the threshold MSE for the incumbent device.

In some embodiments, an AP may comprise a processing device and a transceiver. The processing device may be configured to: determine interference between the AP and one or more incumbent devices; determine a distance between the AP and the one or more incumbent devices; and determine an AP location based on a location of a close proximity communication device. The transceiver may be configured to: send, from the AP for transmission to an AFC server, the AP location, and receive, at the AP from the AFC server, a transmission power mode permission.

In some embodiments, a close proximity communication device may comprise a transceiver and a processing device. The transceiver may be configured to receive an AP identifier from an AP. The processing device may be configured to determine a close proximity communication device location; determine a distance between the close proximity communication device and the AP; and determine an AP location based on the close proximity communication device location and the distance between the close proximity communication device and the AP. The transceiver may be further configured to transmit one or more of the AP identifier or the AP location to an AFC server.

In some embodiments, an AFC server may comprise: an AFC database comprising incumbent device data for an incumbent device, and a processing device. The processing device may be configured to: receive an access point (AP) location from one or more of an AP or a close proximity communication device; determine a distance between the AP and the incumbent device; and determine a transmission power mode permission based on the distance between the AP and the incumbent device. The transceiver may be further configured to transmit the transmission power mode permission to the AP.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 4 illustrates a block diagram of an example automated frequency coordination (AFC) system.

FIG. 10 illustrates an example process flow for a computer readable medium used for automatic frequency coordination.

DESCRIPTION OF EMBODIMENTS

Figure 1:
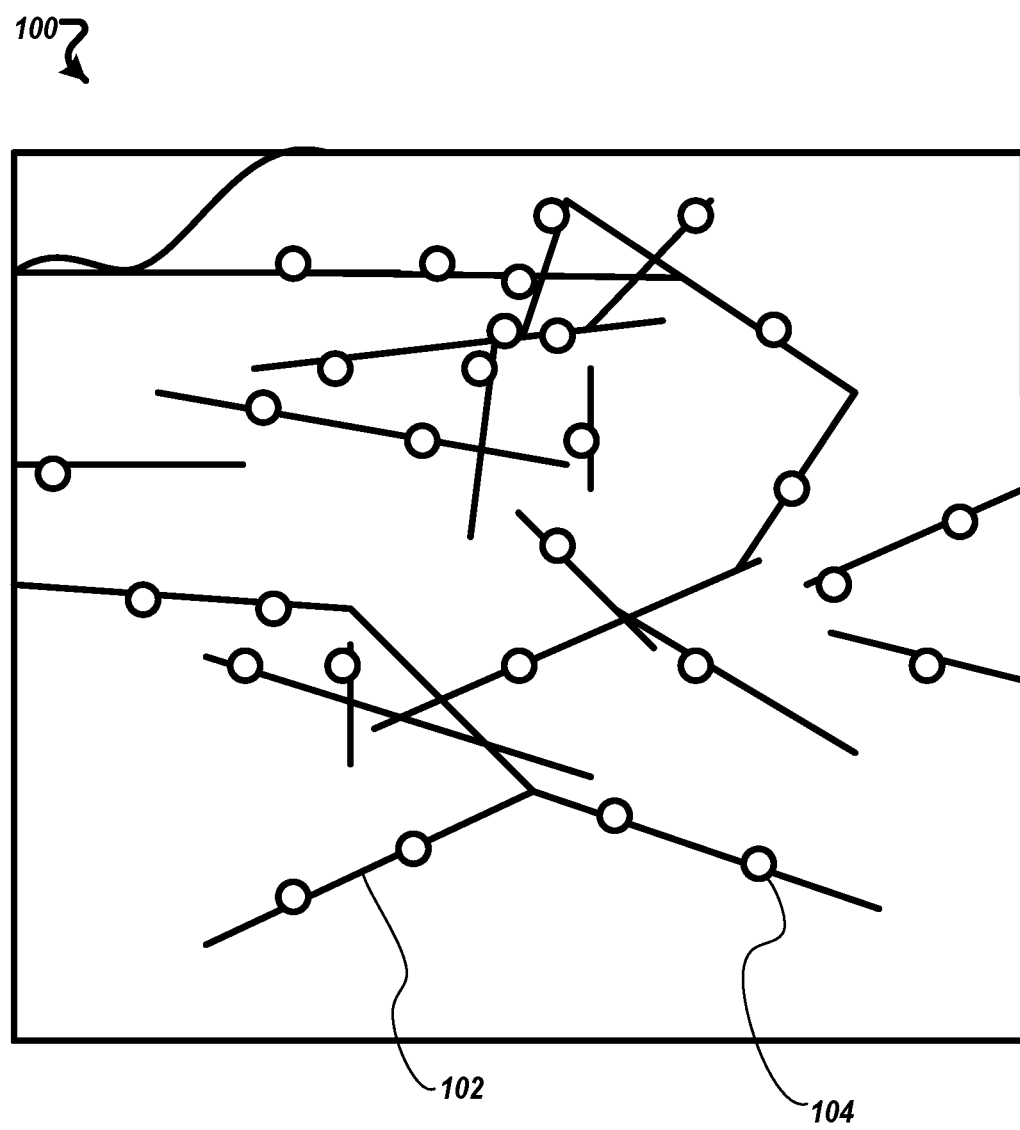
FIG. 1 illustrates an example diagram showing service paths in an example service area.

In association with 6 gigahertz (GHz) Wi-Fi® communications, the Federal Communications Commission (FCC) has set forth predicted interference-to-noise (I/N) ratios for 6 GHz receivers (e.g., incumbent systems) that may not exceed −6 dB. In some circumstances, an access point (AP) seeking deployment may demonstrate communications in the 6 GHz frequency band do not exceed −6 dB I/N through lab testing and/or field testing. In some circumstances, the FCC may withhold communication authorization for an AP that has not demonstrated an acceptable I/N ratio.

Preventing excess interference in the 6 GHz frequency band may prevent interference to incumbent devices operating in the 6 GHz frequency band. The FCC has issued a regulation that standard power APs may be configured to transmit 6 GHz communications by communicating with an automated frequency coordination (AFC) service to protect or coexist with incumbent 6 GHz communications. In some circumstances, an AFC database may be configured to store devices and/or associated frequencies configured to communicate in the 6 GHz frequency. For example, the FCC may request and/or have incumbent 6 GHz users register devices in an AFC database. The I/N ratio data may be collected by an AFC server or regulatory database from the relevant microwave controllers used to allow Wi-FI® APs to operate near the fringes of the link geometry.

Some embodiments may include a MSE estimator that may be located at a receiver, such as a microwave receiver. The MSE estimator may be configured to determine and/or estimate MSE using the AFC server. In some embodiments, the MSE estimator may determine mean square error values at a receiver. Determining or estimating the MSE may be based on, or may include, one or more of estimates or measurements of one or more of distortion, interferences, or noise power, among other data. The MSE estimator may use any data related to a particular receiver, to a network, to an AP, or the like to determine MSE values.

The MSE values may be used for AP deployment, such as for Wi-Fi® AP deployment. In an example, an AFC server may use the MSE values to verify real-time environmental data, and may make deployment decisions based on the MSE values. For example, the AFC server may use the MSE values to reduce uncertainty when deploying an AP in a particular location. The MSE values may better inform the AFC server when deploying APs. Additionally or alternatively, the MSE values may assist the AFC server in adjusting or shutting off APs during operation (e.g., based on changed conditions as reflected and indicated by the MSE values).

An AP configured to transmit 6 GHz frequencies may be configured to access the AFC database. The 6 GHz AP may be configured to determine frequencies in the AFC database relative to the frequencies of operation of the 6 GHz AP. In instances in which a 6 GHz AP fails to access and/or compare operational frequencies to the registered frequencies in the AFC database, the 6 GHz AP may be limited to communications in a low power mode.

In some embodiments, an automatic frequency coordination (AFC) server may comprise an AFC database comprising incumbent device data for an incumbent device, and a processing device. The processing device may be configured to: determine a mean square error (MSE) value for the incumbent device; compute an interference to noise (I/N) ratio for the incumbent device based on the MSE value for the incumbent device; and compute one or more operating frequencies for an access point. The one or more operating frequencies may have the I/N ratio of less than a threshold at the incumbent device.

In some embodiments, an AP may comprise a processing device and a transceiver. The processing device may be configured to: determine interference between the AP and one or more incumbent devices; determine a distance between the AP and the one or more incumbent devices; and determine an AP location based on a location of a close proximity communication device. The transceiver may be configured to: send, from the AP for transmission to an AFC server, the AP location, and receive, at the AP from the AFC server, a transmission power mode permission.

As illustrated in FIG. 1, an example diagram is provided showing service paths (e.g., 102) of microwave links that may be 6 GHz communication systems (e.g., 104) in an example service area 100 (e.g., a specific city). The service area 100. An access point (AP) (e.g., a WiFi AP configured to operate in a 6 GHz frequency band) may obtain service paths (e.g., 102) associated with incumbent systems (e.g., 6 GHz communication systems 104) in the service area 100 from an AFC database. The AP may be configured to determine a distance between the AP and the incumbent systems (e.g., 6 GHz communication systems 104). The AP may be configured to determine interference between transmissions from the AP and one or more incumbent systems (e.g., 6 GHz communication systems 104) and the AP may be configured to determine whether to (i) transmit in a standard power mode, (ii) transmit in a low power mode, (iii) transmit in a very low power mode, or (iv) not transmit.

Various regulations and proposals from governmental and industry sources may impact use of the 6 GHz frequency band. The FCC has promulgated regulations affecting the permissible interference to noise (I/N) ratio in the 6 GHz frequency band. For example, the I/N ratio may not exceed −6 decibels (dB) in the 6 GHz frequency band. In some areas of Europe, other interference proposals have been set forth relating to a long term interference criteria in which the I/N ratio may not exceed −10 dB (or alternatively −20 dB) for a selected percentage of time (e.g., 20%). In some areas of Europe, proposals have been set forth such relating to the short-term interference criteria in which the I/N ratio may not exceed 19 dB for greater than $4.5 \times 10^{-4}\%$ of the time in any month (as a percentage of error seconds).

Industry groups have proposed various differences from these governmental regulations and proposals. These counter proposals to the FCC 6 GHz regulations have been presented by interested parties, such as the Wi-Fi® Alliance (WFA). Some of the counter proposals have included one or more variations to: (1) operational radio bands (e.g., Unlicensed National Information Infrastructure (UNIT) frequency bands), (2) applicability of low power APs, and (3) additional power modes (e.g., transmit power classes).

For example, the WFA has requested an additional 100 MHz to be allocated for use in the UNII-8 frequency band. The UNII-8 frequency band may correspond to communications including frequencies between 6.875 GHz and 7.125 GHz. Other frequency bands that may be included for use in 6 GHz communications include one or more of UNII-5 (5.925 GHz and 6.425 GHz), UNII-6 (6.425 GHz and 6.525 GHz), or UNII-7 (6.525 GHz and 6.875 GHz).

The WFA has also requested removing indoor limitations associated with low-power operation in the 6 GHz frequency band. The FCC, alternatively, has requested limits on the use of low power 6 GHz communications to be indoor.

The WFA has also requested an additional class of 6 GHz communications to operate using very low power. The various transmit power classes may include: (1) standard power transmissions that may include transmissions having a power of up to about 36 dBm, (2) low power transmissions that may include transmissions having a power of up to about 30 dBm, (3) and very low power transmissions that may include transmissions having a power of up to about 14 dBm. As requested by the WFA, the very low power transmit power class may be used in short-range applications (e.g., for portable APs).

The WFA has also requested that client devices (e.g., user equipment receiving wireless communications from the AP) use a transmit power class that matches the transmit power class of the corresponding AP. For example, a client device, that is receiving wireless communications from an AP that is transmitting in a low-power transmit power class, may use low-power transmit power class for wireless communications to the AP.

To comply with this request by the WFA, one or more of the AP or the client device may include a transmit power class control, configured to match the transmit power class used by the client device to the transmit power class used by the AP.

Figure 2:
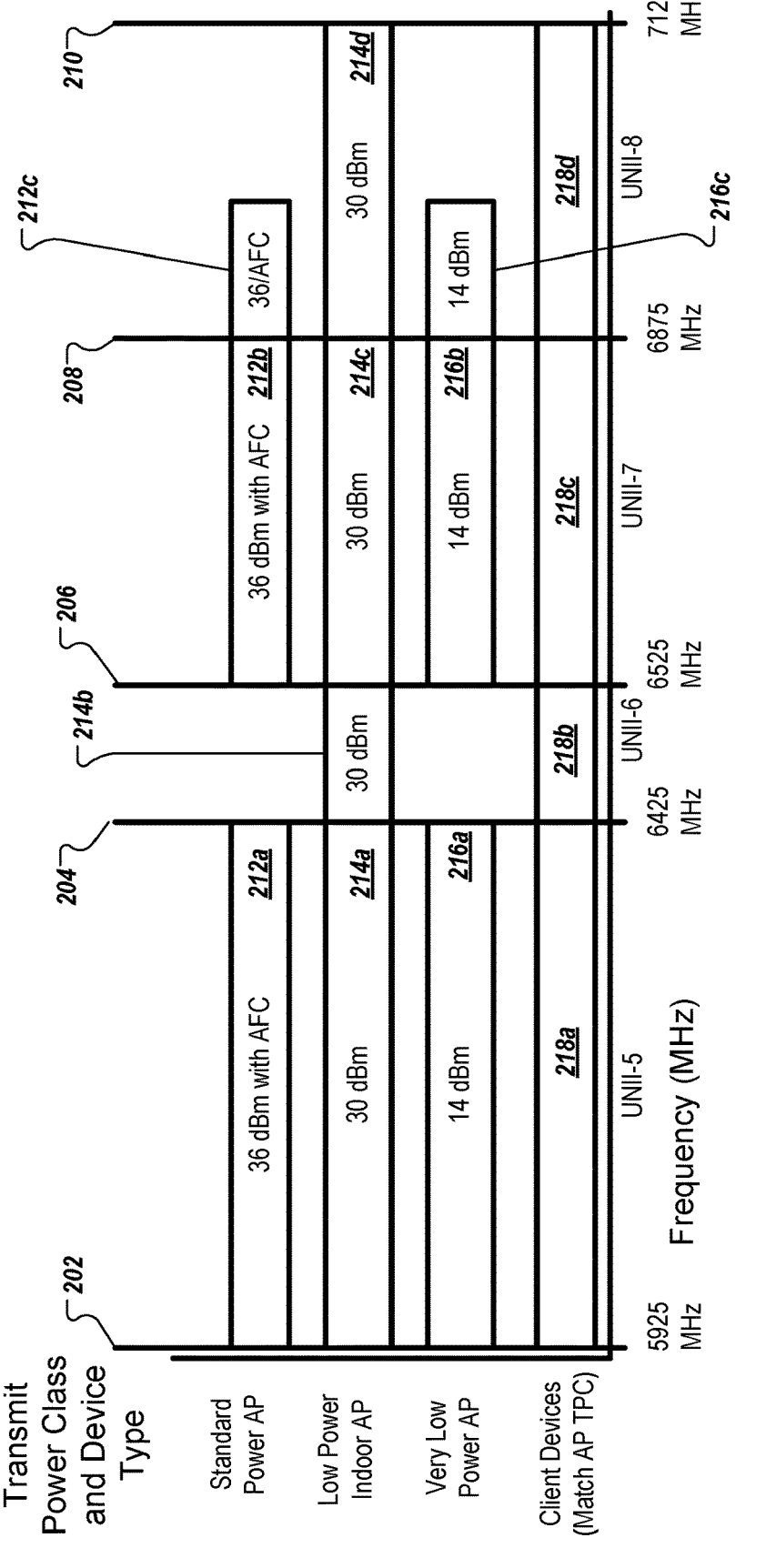
FIG. 2 illustrates a graph showing the transmit power class and device type as a function of frequency in megahertz (MHz).
Figure 3:
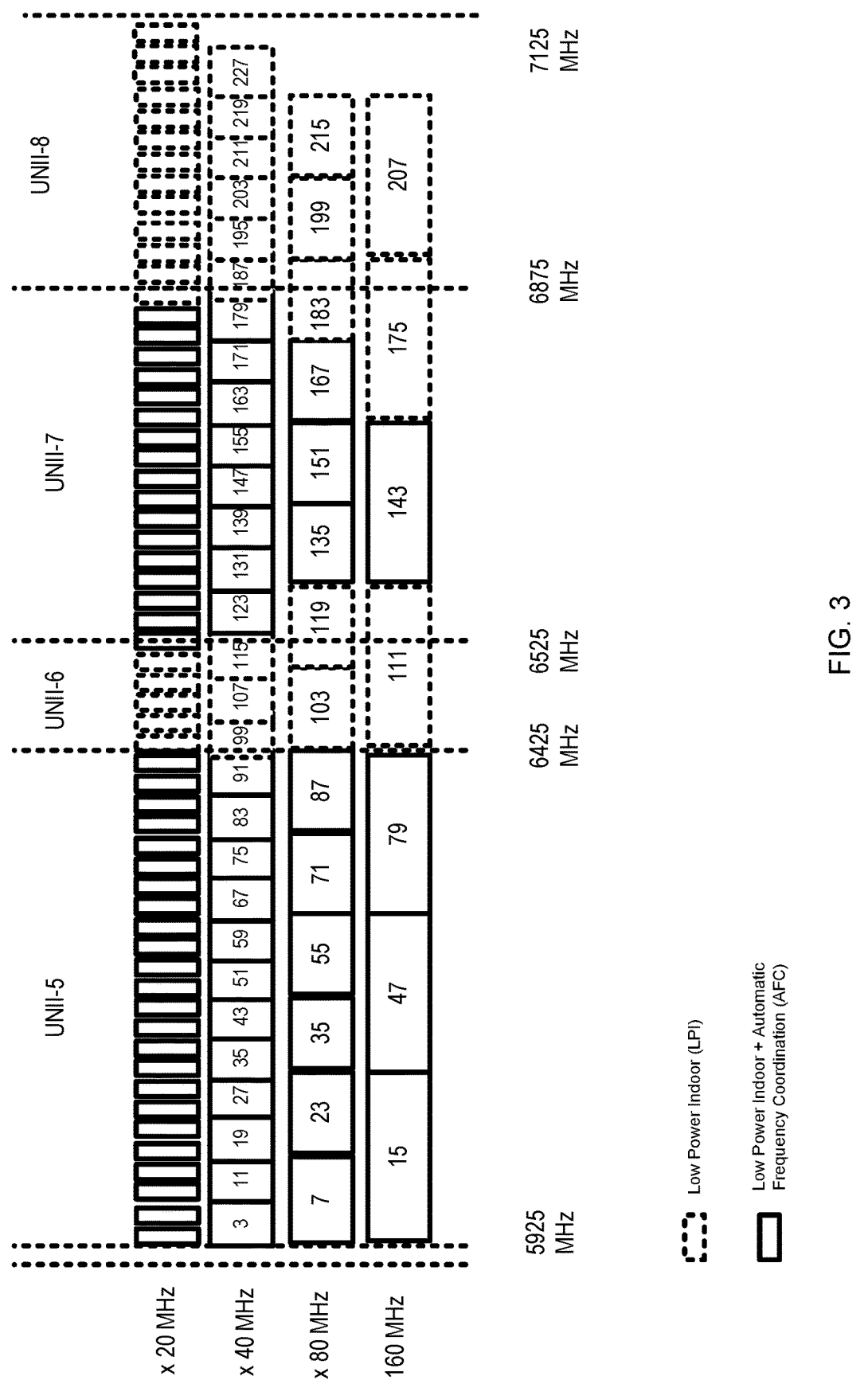
FIG. 3 illustrates an example of 6 gigahertz (GHz) channels.

FIG. 2 illustrates some of the counter proposals to the FCC regulations. FIG. 3 and Table I provide a summary of some of the FCC regulations. FIG. 2 provides a graph showing the transmit power class and device type as a function of frequency in megahertz (MHz). The 6 gigahertz (GHz) frequency band may include 4 frequency sub-bands: (i) UNII-5 having a frequency range of from 5925 MHz (202) to 6425 MHz (204), (ii) UNII-6 having a frequency range of from 6425 MHz (204) to 6525 MHz (206), (iii) UNII-7 having a frequency range of from 6525 MHz (206) to 6875 MHz (208), or (iv) UNII-8 having a frequency range of from 6875 MHz (208) to 7125 MHz (210).

When APs are allocated bandwidth by an AFC server, the APs may be permitted to operate using a standard power transmit power class. For standard power APs, the maximum transmit power may be an effective isotropic radiated power (EIRP) of about 36 decibel milliwatts (dBm) for: (a) APs operating within the UNII-5 frequency sub-band, as shown by 212a, (b) for APs operating within the UNII-7 frequency sub-band, as shown by 212b, or (c) for APs operating within a portion of the UNII-8 frequency sub-band, as shown by 212c.

When APs are not allocated bandwidth by an AFC server, the APs may be permitted to operate using a low power indoor (LPI) transmit power class. For APs operating in an LPI transmit power class, the maximum permitted transmit power may be an EIRP of about 30 dBm for: (a) APs operating within the UNII-5 frequency sub-band, as shown by 214a, (b) for APs operating within the UNII-6 frequency sub-band, as shown by 214b, (c) for APs operating within the UNII-7 frequency sub-band, as shown by 214c, or (d) for APs operating within the UNII-8 frequency sub-band, as shown by 214d.

APs operating using the very low power transmit power class, as proposed by WFA, may be used in short-range applications (e.g., for portable APs). For APs operating in a very low power transmit power class, the maximum permitted transmit power may be an EIRP of about 14 dBm for: (a) APs operating within the UNII-5 frequency sub-band, as shown by 216a, (b) for APs operating within a UNII-7 frequency sub-band, as shown by 216b, or (c) for APs operating within a portion of the UNII-8 frequency sub-band, as shown by 216c.

The WFA has further proposed that client devices use a transmit power that match one or more of the transmit power or the transmit power class for the corresponding AP. That is, for client devices that operate in the 6 GHz frequency band, a client device may: (i) match a standard power transmit power class when the corresponding AP uses a standard power transmit power class; (ii) match a low power indoor transmit power class when the corresponding AP uses a low power indoor transmit power class; or (iii) match a very low power transmit power class when the corresponding AP uses a very low power transmit power class. The clients devices may be configured to match the transmit power class for the corresponding AP across the 6 GHz frequency band, as shown by 218a, 218b, 218c, and 218d.

Table I provides an example of the FCC regulations for the 6 GHz frequency band. For a channel bandwidth of from about 20 MHz to about 320 MHz (e.g., for a channel bandwidth of 20 MHz, or 40 MHz, or 80 MHz, or 160 MHz, or 320 MHz), the antenna gain in dBi may be 3 (or a maximum or 6 dBi).

For LPI operation, the maximum power spectral density (PSD) may be fixed at 5 dBm/MHz for a channel bandwidth of from about 20 MHz to about 320 MHz (e.g., for a channel bandwidth of 20 MHz, or 40 MHz, or 80 MHz, or 160 MHz, or 320 MHz). The maximum radio frequency (RF) output power may be: (a) 15 dBm for a channel bandwidth of 20 MHz, (b) 18 dBm for a channel bandwidth of 40 MHz, (c) 21 dBm for a channel bandwidth of 80 MHz, (d) 24 dBm for a channel bandwidth of 160 MHz, or (e) 27 dBm for a channel bandwidth of 320 MHz. The maximum EIRP may be: (a) 18 dBm for a channel bandwidth of 20 MHz, (b) 21 dBm for a channel bandwidth of 40 MHz, (c) 24 dBm for a channel bandwidth of 80 MHz, (d) 27 dBm for a channel bandwidth of 160 MHz, or (e) 30 dBm for a channel bandwidth of 320 MHz.

TABLE I

FCC Regulations Impacting 6 GHz channels in the United States.

| | | Low Power Indoor (LPI) | | | Standard Power AP | |
|---|---|---|---|---|---|---|
| Channel Bandwidth (MHz) | Antenna Gain (dBi) | PSD (dBm/ MHz) | RF Output Power (dBm) | EIRP (dBm) | RF Output Power (dBm) | EIRP (dBm) |
| 20 | 3 | 5 | 15 | 18 | 33 | 36 |

TABLE I-continued

FCC Regulations Impacting 6 GHz channels in the United States.

| | | Low Power Indoor (LPI) | | | Standard Power AP | |
|---|---|---|---|---|---|---|
| Channel Bandwidth (MHz) | Antenna Gain (dBi) | PSD (dBm/ MHz) | RF Output Power (dBm) | EIRP (dBm) | RF Output Power (dBm) | EIRP (dBm) |
| 40 | 3 | 5 | 18 | 21 | 33 | 36 |
| 80 | 3 | 5 | 21 | 24 | 33 | 36 |
| 160 | 3 | 5 | 24 | 27 | 33 | 36 |
| 320 | 3 | 5 | 27 | 30 | 33 | 36 |

For standard power operation, the maximum RF output power may be 33 dBm for a channel bandwidth of from about 20 MHz to about 320 MHz (e.g., for a channel bandwidth of 20 MHz, or 40 MHz, or 80 MHz, or 160 MHz, or 320 MHz). The maximum EIRP may be 36 for a channel bandwidth of from about 20 MHz to about 320 MHz (e.g., for a channel bandwidth of 20 MHz, or 40 MHz, or 80 MHz, or 160 MHz, or 320 MHz).

FIG. 3 illustrates an example of 6 GHz channels in the United States. When the channel bandwidth is 160 MHz, 7 different channels in the 6 GHz frequency band may be used including: channels 15, 47, and 79 in the UNII-5 sub-band; channel 111 in the UNII-6 and UNII-7 sub-bands; channels 143 in the UNII-7 sub-band; channel 175 in the UNII-7 and UNII-8 sub-bands; and channel 207 in the UNII-8 sub-band. Channels 15, 47, 79, and 143 may be operable in both a low power indoor transmit power class and in a standard power class in coordination with an AFC server. Channels 111, 175, and 207 may be operable in a low power indoor transmit power class.

When the channel bandwidth is 80 MHz, 14 different channels in the 6 GHz frequency band may be used including: channels 7, 23, 39, 55, 71, and 87 in the UNII-5 sub-band; channel 103 in the UNII-6 sub-band; channel 119 in the UNII-6 and UNII-7 sub-bands; channels 135, 151, and 167 in the UNII-7 sub-band; channel 183 in the UNII-7 and UNII-8 sub-bands; channels 199 and 215 in the UNII-8 sub-bands. Channels 7, 23, 35, 55, 71, 87, 135, 151, and 167 may be operable in both a low power indoor transmit power class and in a standard power class in coordination with an AFC server. Channels 103, 119, 183, 199, and 215 may be operable in a low power indoor transmit power class.

When the channel bandwidth is 40 MHz, 29 different channels in the 6 GHz frequency band may be used including: channels 3, 11, 19, 27, 35, 43, 51, 59, 67, 75, 83, and 91 in the UNII-5 frequency sub-band; channels 99 and 107 in the UNII-6 frequency sub-band; channel 115 in the UNII-6 and UNII-7 frequency sub-bands; channels 123, 131, 139, 147, 155, 163, 171, and 179 in the UNII-7 frequency sub-band; channel 187 in the UNII-7 and UNII-8 frequency sub-bands; channels 195, 203, 211, 219, and 227 in the UNII-8 frequency sub-band. Channels 3, 11, 19, 27, 35, 43, 51, 59, 67, 75, 83, 91, 123, 131, 139, 147, 155, 163, 171, and 179 may be operable in both a low power indoor transmit power class and in a standard power class in coordination with an AFC server. Channels 99, 107, 115, 187, 195, 203, 211, 219, and 227 may be operable in a low power indoor transmit power class.

When the channel bandwidth is 20 MHz, 59 different channels in the 6 GHz frequency band may be used including: channels 1, 5, 9, 13, 17, 21, 25, 29, 33, 37, 41, 45, 49, 53, 57, 61, 65, 69, 73, 77, 81, 85, 89, and 93 in the UNII-5 frequency sub-band; channels 97, 101, 105, 109, and 113 in the UNII-6 frequency sub-band; channels 117, 121, 125, 129, 133, 137, 141, 145, 149, 153, 157, 161, 165, 169, 173, 177, and 181 in the UNII-7 frequency sub-band; channel 185 in the UNII-7 and UNII-8 frequency sub-bands; channels 189, 193, 197, 201, 205, 209, 213, 217, 221, 225, 229, and 233 in the UNII-8 frequency sub-band. Channels 1, 5, 9, 13, 17, 21, 25, 29, 33, 37, 41, 45, 49, 53, 57, 61, 65, 69, 73, 77, 81, 85, 89, 93, 117, 121, 125, 129, 133, 137, 141, 145, 149, 153, 157, 161, 165, 169, 173, 177, and 181 may be operable in both a low power indoor transmit power class and in a standard power class in coordination with an AFC server. Channels 97, 101, 105, 109, 113, 185, 189, 193, 197, 201, 205, 209, 213, 217, 221, 225, 229, and 233 may be operable in a low power indoor transmit power class.

Embodiments of the present disclosure will be explained with reference to the accompanying drawings.

FIG. 4 illustrates a block diagram of an example automated frequency coordination (AFC) architecture 400, in accordance with at least one embodiment described in the present disclosure. The AFC architecture 400 may include a data storage 402, an AFC server 404, a network proxy 406, a first non-standalone AP 408, a second non-standalone AP 410, a standalone AP 416, referred to collectively as the APs, a first client device 412, a second client device 414, a third client device 418, and a fourth client device 420. The AFC server 404 may be a system that determines and provides lists of frequencies that are available for use by access points operating in the 6 GHz frequency band. The network proxy 406 may be a first example of a device configured to access the AFC server 404, the standalone AP 416 may be a second example of a device configured to access the AFC server 404, and the fourth client device 420 may be a third example of a device configured to access the AFC server 404.

The data storage 402 may be an AFC database (i.e., a database configured to interface with the AFC server 404). The AFC database may comprise one or more of a universal licensing system (ULS) database or an equipment authorization system (EAS) database. The AFC database may include incumbent data. In one example, the incumbent data may include a list of incumbent systems or incumbent devices that may be configured to transmit using 6 GHz communications. For example, the ULS database may include a collection of licenses issued for communications using 6 GHz communications, such as a list of microwave links configured to transmit using a frequency between 5925 MHz and 7125 MHz (e.g., UNII-5 frequency band through UNII-8 frequency band). Incumbents may include e.g., fixed service, satellite service, TV, and other broadcast services. In some embodiments, the data storage may be managed by a regulatory agency, such as the FCC.

The AFC database may include incumbent device data for one or more incumbent devices. The incumbent device data may include one or more of: a request identifier (e.g., RequestID), incumbent device description data (e.g., a serial number, a certification identifier, a rule set identifier), location data (e.g., elliptical location data such as center longitude, center latitude, majorAxis, minorAxis, or orientation; elevation location data such as height, height type, or vertical uncertainty; or indoor deployment data), an inquired frequency range (e.g., a low frequency and a high frequency in a frequency range in the 6 GHz frequency band), inquired channel data, or the like. In one example, the incumbent device data may include one or more of: a geolocation, a location confidence, an antenna height, an FCC identifier (ID), a serial number, interference data, distortion data, noise power data, environmental data, or the like.

The AFC server 404 may be configured to obtain at least a portion of data from the data storage 402. For example, the AFC server 404 may be configured to obtain one or more microwave links, such as from one or more of an incumbent system or an incumbent device. The microwave links may be obtained from within a geographic area (e.g., within a selected range).

Alternatively or in addition, the AFC server 404 may be configured to receive operational characteristics from a device such as e.g., an access point (a first non-standalone AP 408 or a second non-standalone AP 410 via a network proxy 406, a standalone AP 416) or a client device (e.g., a first client device 412 or second client device 414 via the first non-standalone AP 408 or the second non-standalone AP 410, respectively, via the network proxy 406; or a third client device 418 via the standalone AP 416; or a fourth client device 420). Alternatively, or additionally, the AFC server 404 may be configured to receive operational characteristics from one or more receivers in the networks, such as a microwave receiver or a backhaul receiver.

The operational characteristics may include any suitable characteristics used in one or more of allocating bandwidth to a device or avoiding interference between incumbent systems/devices and another device that may be stored in the data storage 402. The operational characteristics may include one or more of: a request identifier (e.g., RequestID), incumbent device description data (e.g., a serial number, a certification identifier, a rule set identifier), location data (e.g., elliptical location data such as center longitude, center latitude, majorAxis, minorAxis, or orientation; elevation location data such as height, height type, or vertical uncertainty; or indoor deployment data), an inquired frequency range (e.g., a low frequency and a high frequency in a frequency range in the 6 GHz frequency band), inquired channel data, a geolocation, a location confidence, an antenna height, an FCC identifier (ID), a serial number, interference data, distortion data, noise power data, environmental data, or the like.

The AFC server 404 may be configured to determine a mean square error (MSE) value for the incumbent device. The AFC server 404 may be configured to determine an MSE for a receiver based on received operational characteristics. In one example, the AFC server 404 may be configured to determine the MSE for the receiver using any suitable operational characteristic as provided with respect to one or more of the data storage 402 or as received by the AFC server 404 from the data storage 402.

The AFC server 404 may also be configured to receive data for determining the MSE value from any other suitable source used to compute the MSE values. Unlike the signal-to-noise ratio (SNR), which may be computed based on noise power, the MSE may be computed based on one or more of estimates or measurements of one or more of noise power, distortion, and interference. Data for one or more of noise power, distortion, or interference may be available at, e.g., a microwave modem, and may be provided to the AFC server 404. An application protocol interface (API) between the microwave modem and the AFC server 404 may be used to provide the data for one or more of the noise power, distortion, or interference to the AFC server 404 from the microwave modem.

The AFC server 404 may be configured to determine one or more of estimates or measurements of one or more of distortion, interference, noise power, or the like for any suitable component in the architecture 400 such as APs (e.g., first non-standalone AP 408, second non-standalone AP 410, standalone AP 416, or the like) or any other suitable component such as radios, microwave systems, microwave modems, microwave receivers, or the like. The AFC server 404 may be configured to use one or more models to determine the MSE.

The AFC server 404 may be configured to provide one or more operating frequencies to a device (e.g., a Wi-Fi® AP) to avoid an interference condition. In one example, the operating frequencies may not cause an I/N ratio of greater than a threshold (e.g., −6 dB in accordance with an FCC regulation). For example, the AFC server 404 may determine that a first frequency in the 6 GHz frequency band may cause an I/N ratio of less than a threshold (e.g., less than −6 dB) at an incumbent system, and the AFC server 404 may provide the first frequency in the 6 GHz frequency band to the device (e.g., a Wi-Fi® AP) to be used as an operating frequency.

The AFC server 404 may be configured to provide one or more operating frequencies to a device (e.g., a Wi-Fi® AP) to avoid a time-based interference condition. In one example, the time-based interference condition may prohibit an I/N ratio that exceeds a threshold (e.g., 19 dB) for more than a selected percentage of time (e.g., for more than $4.5\times10^{-4}$%) in a selected time period (e.g., a day, a week, a month, or the like). In another example, the time-based interference condition may prohibit an I/N ratio that exceeds a threshold (e.g., −10 dB, −20 dB, or the like), for a selected percentage of time (e.g., 20%) in a selected time period (e.g., a day, a week, a month, or the like).

The AFC server 404 may be configured to compute or estimate an interference to noise (I/N) ratio for the incumbent device based on the MSE value for the incumbent device. The actual I/N impact at a microwave receiver may not be available to the AFC server 404. The AFC server 404, a governmental entity, or a regulatory entity (e.g., the FCC) may rely on offline feedback, such as MSE values, to determine compliance with the I/N ratio. In addition to determining compliance with the regulation (e.g., the FCC regulation to avoid an I/N ratio of greater than −6 dB), the techniques described herein may be used to provide historical data for debugging (e.g., debug views like spectrum waterfall) and maintenance.

The AFC server 404 may be configured to determine the threshold based on a maximum acceptable MSE value for a modulation type. There may be maximum acceptable MSE values for each modulation which may be used to determine the quality of the link. The MSE of each transmit/receiver (Tx-Rx) path may be used to verify the link is operating as expected (e.g., with an adequate quality).

Modifications, additions, or omissions may be made to the AFC server 404 without departing from the scope of the present disclosure. For example, in some embodiments, the AFC server 404 may include any number of other components that may not be explicitly illustrated or described.

Figure 5:
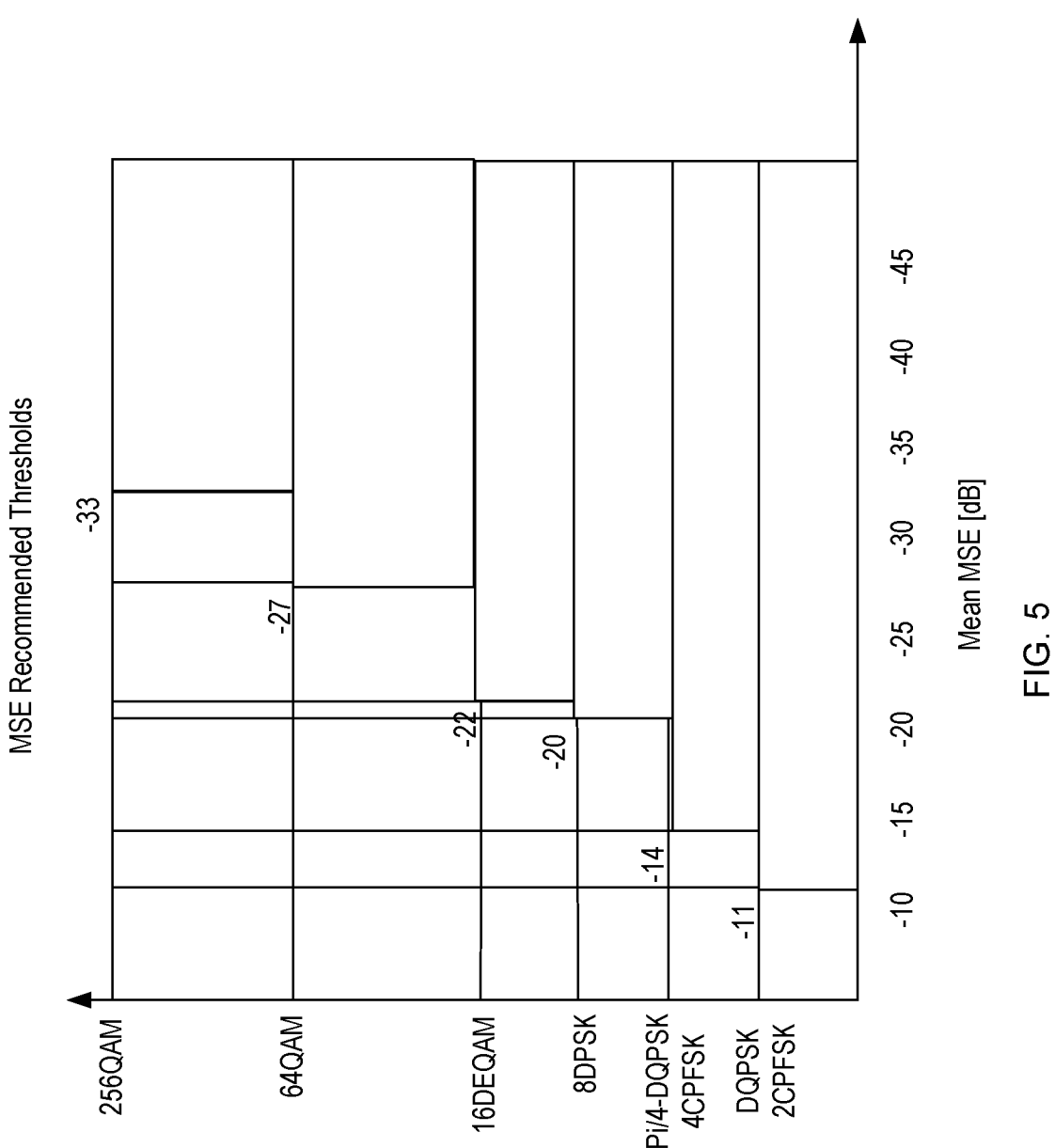
FIG. 5 illustrates an example mean square error (MSE) thresholds.

As illustrated in FIG. 5, the mean MSE threshold (e.g., the mean of the MSEs for each Tx-Rx path) may vary based on the type of modulation. For differential quadrature phase shift keying (DQPSK) or for binary continuous phase frequency shift keying (2CPFSK) modulation, the mean MSE threshold may be −11 dB (i.e., the mean MSE may be less than −11 dB). For π/4 differential quadrature phase shift keying (π/4-DQPSK) or for continuous 4-phase frequency shift keying (4CPFSK) modulation, the mean MSE threshold may be −14 dB (i.e., the mean MSE may be less than −14 dB). For 8 phase differential shift keying (8DPSK) modulation, the mean MSE threshold may be −20 dB (i.e., the mean MSE may be less than −20 dB). For 16-ary differentially encoded quadrature amplitude (16DEQAM) modulation, the mean MSE threshold may be −22 dB (i.e., the mean MSE may be less than −22 dB). For 64 level quadrature amplitude modulation (64QAM), the mean MSE threshold may be −27 dB (i.e., the mean MSE may be less than −27 dB). For 256 level quadrature amplitude modulation (256QAM), the mean MSE threshold may be −33 dB (i.e., the mean MSE may be less than −33 dB).

Example thresholds for the mean MSE in dB for different modulations and forward error correction (FEC) coding rates are provided in Table II. For 16DEQAM modulation and an FEC coding rate of ¾, the mean MSE threshold may be −19 dB (i.e., the mean MSE may be less than −19 dB). For 16DEQAM modulation and an FEC coding rate of 1/1, the mean MSE threshold may be −22 dB (i.e., the mean MSE may be less than −22 dB). For 64QAM modulation and an FEC coding rate of ¾, the mean MSE threshold may be −24 dB (i.e., the mean MSE may be less than −24 dB). For 64QAM modulation and an FEC coding rate of 1/1, the mean MSE threshold may be −27 dB (i.e., the mean MSE may be less than −27 dB). For 256QAM modulation and an FEC coding rate of ¾, the mean MSE threshold may be −30 dB (i.e., the mean MSE may be less than −30 dB). For 256QAM modulation and an FEC coding rate of 1/1, the mean MSE threshold may be −33 dB (i.e., the mean MSE may be less than −33 dB).

TABLE II

| Modulation & FEC Code Rate ([—]) | Mean MSE Threshold (dB) |
| --- | --- |
| 256 QAM 1/1 | −33 |
| 256 QAM 3/4 | −30 |
| 64 QAM 1/1 | −27 |
| 64 QAM 3/4 | −24 |
| 16 DEQAM 1/1 | −22 |
| 16 DEQAM 3/4 | −19 |

Figure 6:
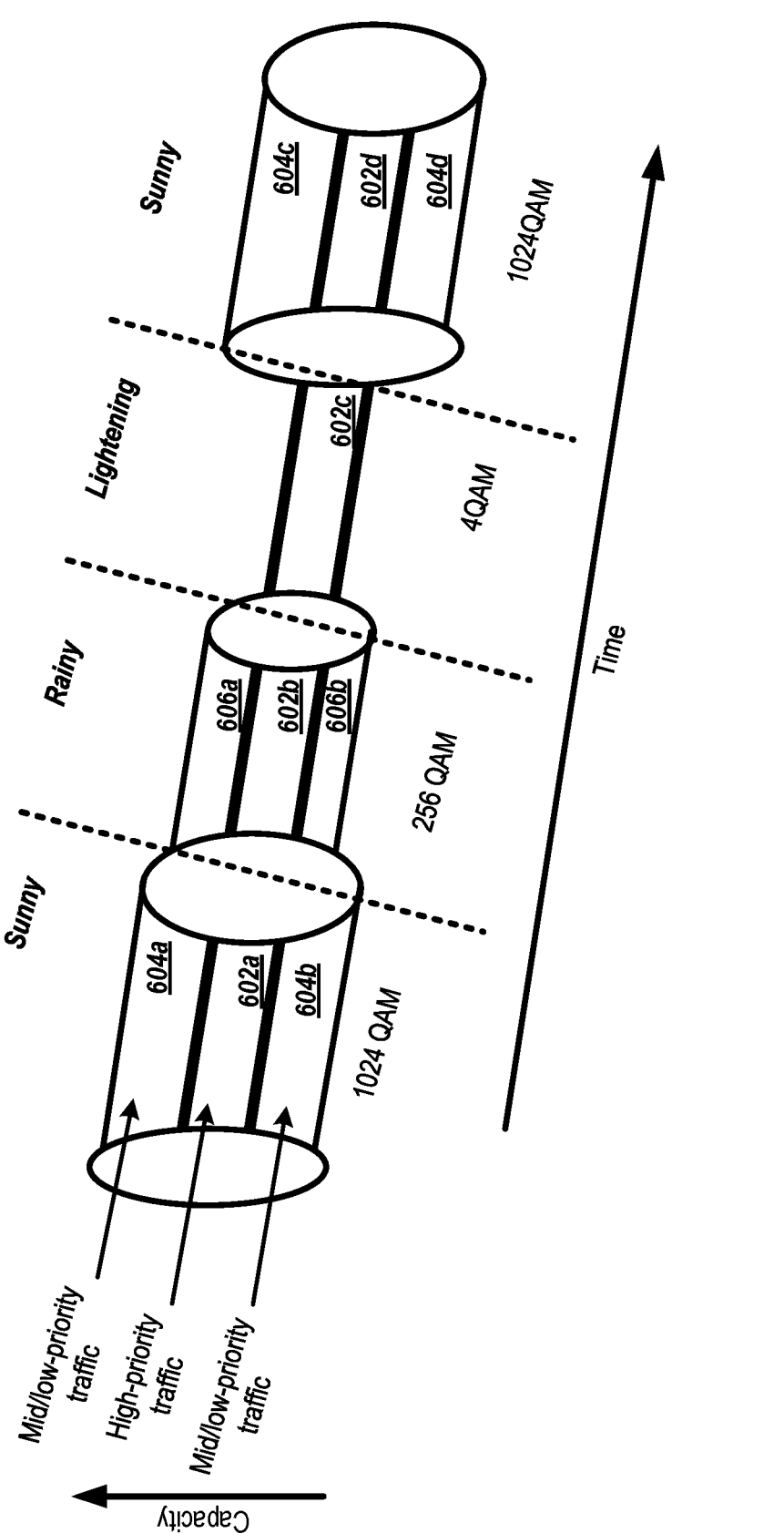
FIG. 6 illustrates an example of different modulation types with varying amounts of capacity in different weather conditions.

Different modulation types and may be used to provide varying amounts of capacity in different weather conditions as illustrated by the graph 600 in FIG. 6. For example, when the weather is sunny, a high-capacity modulation type may be used (e.g., 1024 QAM) so that the network capacity may allow mid/low priority traffic 604a, 604b and high priority traffic 602a to be carried over the network. When the weather is rainy, a mid-capacity modulation type may be used (e.g., 256 QAM) so that the network capacity may not allow the low priority traffic to be carried over the network. In this situation, the high-priority traffic 602b may be carried over the network and the mid-priority traffic 606a and 606b may be carried over the traffic. When the weather includes lightening, a low-capacity modulation type may be used (e.g., 4 QAM) so that the network capacity may allow the high-priority traffic 602c to be carried over the network, but the mid-priority traffic and the low priority traffic may not be carried over the network. When the weather is sunny once more, a high-capacity modulation type may be used (e.g., 1024 QAM) so that the network capacity may allow the mid/low priority traffic 604c, 604d to be carried over the network in addition to the high-priority traffic 602d.

Figure 7A:
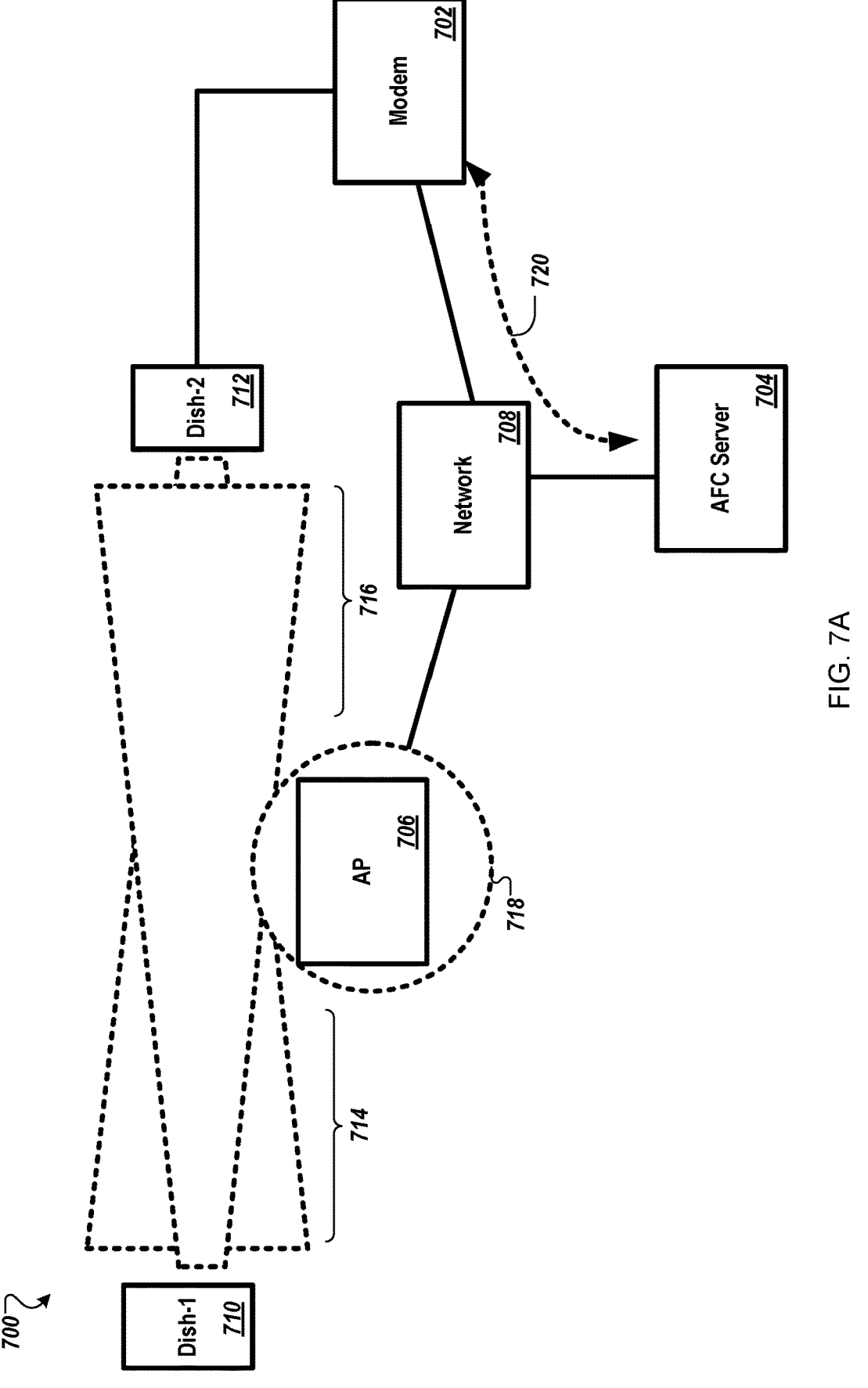
FIG. 7A illustrates an example system architecture of an AFC server, an access point, and a modem.

FIG. 7A illustrates an example system architecture 700 in which the AFC server 704 may be configured to one or more of receive, acquire, calculate or verify the MSE. The MSE may be one or more of received, acquired, calculated, or verified in real-time. The system architecture 700 may include one or more dishes (e.g., Dish-1 710 and Dish-2 712). The one or more dishes (e.g., 710 and 712) may be configured for various systems including, but not limited to, a microwave system. Any number of dishes, dish pairs, or the like may be included in the system architecture 700. The one or more dishes (e.g., 710 and 712) may each be coupled to a respective tower. Each of the one or more dishes (e.g., 710 and 712) may be coupled to a modem 703. The modem 703 may be coupled via a wireless connection 720 to a network 708 (e.g., the Internet). Through the network 708, the modem 703 may be coupled via the wireless connection 720 to the AFC server 704.

The system architecture 700 may include various types of APs including an AP 706 that may include a Wi-Fi® AP. The Wi-Fi® AP may be configured to provide Wi-Fi® to devices that may be communicatively coupled to the APs using a 6 GHz frequency band including one or more of the UNII-5, UNII-6, UNII-7, or UNII-8 sub-bands.

The system architecture 700 may comprise an AP 706 having a radiation pattern 718 that may be in a communication path between the one or more dishes (e.g., Dish-1 710 and Dish-2 712). As illustrated, Dish-1 710 and Dish-2 712 may form a microwave link path (e.g., microwave link path 714 and microwave link path 716) in which the AP has a radiation pattern 718 in the communication path.

The AFC server 704 may be configured to determine an MSE before an AP 706 is activated and after the AP 706 is activated to compute an MSE difference for the AP 706 activation. Alternatively or in addition, the AFC server 704 may determine the MSE before the AP 706 is provisioned or after the AP 706 is provisioned.

The AFC server 704 may query the microwave modems for data to compute the real-time impact of turning on a Wi-FI® AP in the path of the one or more dishes (e.g., Dish-1 710 and Dish-2 712). This data may enhance the models used in the AFC server 704 to reduce the AP's 706 location uncertainty and help deploy more APs closer in proximity to the microwave links.

The AFC server 704 may be configured to compute one or more operating frequencies for the AP 706 (e.g., a Wi-Fi® AP), to facilitate an I/N ratio of less than a threshold at the incumbent device. For example, the operating frequencies for the AP 706 may be computed to be less than the MSE thresholds provided in FIG. 5 or Table II so that the I/N ratio may be less than a threshold at the incumbent device.

The AP 706 may be configured to access an AFC server 704. In one example, the AP 706 may be configured to access the AFC server 704 to compare an AFC database frequency for an incumbent device (e.g., Dish-1 710 or Dish-2 712) to an AP 706 operational frequency. The AP 706 may be configured to determine a predicted interference between a transmission from the AP 706 and the incumbent device (e.g., Dish-1 710 or Dish-2 712) when the AP 706 operational frequency is used. The AP 706 may be configured to determine a power mode (e.g., standard power, low power indoor, very low power, or the like) based on the predicted interference. The AP may comprise a transceiver configured to transmit a signal on the AP 706 operational frequency at the power mode.

In some embodiments, the AP 706 may be in the path of the incumbent transmission as illustrated by Dish-1 710 microwave link path 714, Dish-2 712 microwave link path 716 (e.g., an incumbent transmission path), and the AP 706 radiation pattern 718. In this situation, or when the AP 706 is acquiring operational frequencies, the AP 706 may be configured to transmit operational data to the AFC server 704. The operational data may be used to allow the AFC server 704 to determine operational frequencies that may not interfere with incumbent transmission (e.g., communication between Dish-1 710 or Dish-2 712). The AP 706 may be configured to transmit on the AP operational frequency that may include one or more of a UNII-5 frequency band, a UNII-6 frequency band, a UNII-7 frequency band, a UNII-8 frequency band, or a different 6 GHz frequency band.

In some embodiments, the power mode for the AP may be selected to facilitate a predicted interference of less than a predicted I/N ratio. The predicted I/N ratio may be less than any suitable threshold as set forth by a regulatory authority or a governmental entity (e.g., −6 dB as set forth by the FCC for Wi-Fi® communications in the 6 GHz frequency band).

Figure 7B:
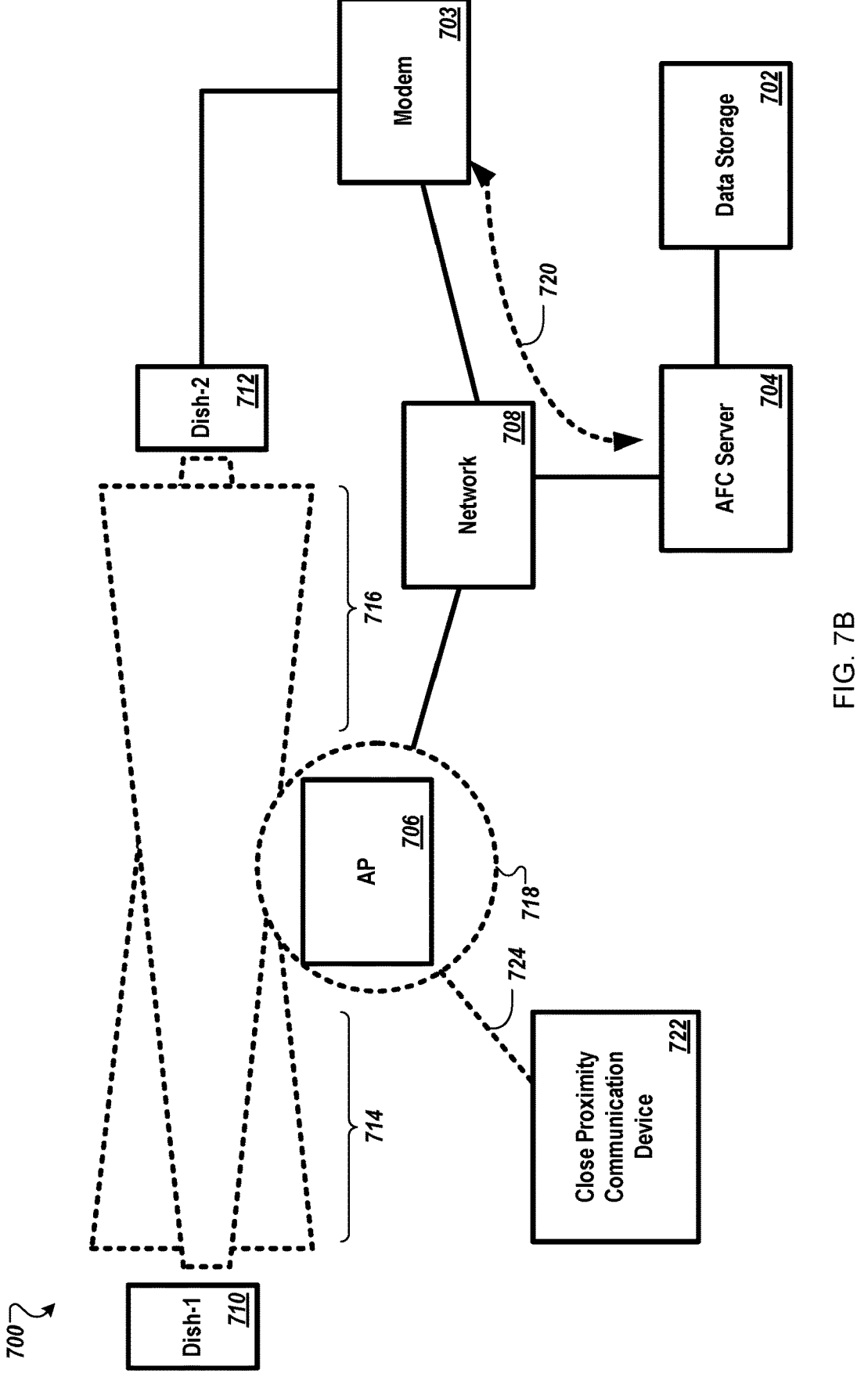
FIG. 7B illustrates an example system architecture of an AFC server, an access point, and a modem.

The AP 706 may be configured to communicate with a close proximity communication device 722 via a wireless connection 724, as illustrated in FIG. 7B. The AFC server 704 may be configured to be in communication with a data storage 702 (e.g., an AFC database). The data storage 702 may comprise incumbent device data for an incumbent device (e.g., Dish-1 710 and Dish-2 712).

The AP may comprise a processing device that may be configured to receive an AP location from one or more of an AP 706 or a close proximity communication device 722. In one example, the close proximity communication device 722 may be configured to communicate using various close proximity communication protocols such as: (i) a wireless close proximity communication protocol such as near field communication (NFC), Bluetooth®, Bluetooth® Low Energy (BLE), infrared, a wireless local area network (WLAN) such as Wi-Fi® or Ethernet, a home area network, a building area network, a campus area network, or the like, or (ii) a wired close proximity communication protocol such as universal serial bus (USB), Institute of Electrical and Electronics Engineers (IEEE) 1394 (e.g., FireWire®), Thunderbolt®, or the like.

The AP 706 may be configured to determine a distance between the AP 706 and the incumbent device (e.g., Dish-1 710 and Dish-2 712). The distance between the AP 706 and the incumbent device (e.g., Dish-1 710 and Dish-2 712) may be computed based on the location of the AP 706 and the location of the incumbent device (e.g., Dish-1 710 and Dish-2 712). The location of the AP 706 may be determined using the close proximity communication device 722.

One or more of the location of the close proximity communication device 722 or the signal strength between the close proximity communication device 722 and the AP 706 may be used to compute the location of the AP 706 within a margin of error in which the margin of error may be a variance in area in the proximity of the AP 706. For example, when the close proximity communication device 722 is configured to communicate using NFC, which may have a communication range of up to 10 cm, then the margin of error for the location of the AP 706 may be less than about 10 cm. In contrast, when the close proximity communication device 722 is configured to communicate using Bluetooth®, which may have a communication range of up to 30 feet, then the margin of error for the location of the AP 706 may be less than about 30 feet. The signal strength for the communication signal between the AP 706 and the close proximity communication device 722 may be used to adjust the margin of error for the AP location.

The angle of arrival of a transmission may be used to adjust the AP location. In one example, the angle of arrival of a transmission received at the AP 706 from the close proximity communication device 722 may provide further location data for determining the location of the AP 706. In another example, the angle of arrival of a transmission received at the close proximity communication device 722 from the AP 706 may provide further location data for determining the location of the AP 706. In another example, the angle of arrival of a transmission received at the close proximity communication device 722 from the AFC server 704, or vice versa, may provide further location data for determining the location of the AP 706. In another example, the angle of arrival of a transmission received at the AP 706 from the AFC server 704, or vice versa, may provide further location data for determining the location of the AP 706. For example, one or more of the AP 706, the close proximity communication device 722, or the AFC server 704 may be configured to obtain an angle of arrival for transmissions received at each antenna of the multiple antennas of the AP 706, or the close proximity communication device 722, or the AFC server 704 to determine the approximate location or position of the AP 706. The radio signal's angle of arrival may be the direction from which the wave was received relative to the position of the AP 706. The angle of arrival may be measured using multiple antennas receiving the same wave and correlating with the time stamp of the signal received on each antenna.

The AFC server 704 may be configured to determine a transmission power mode permission based on the distance between the AP 706 and the incumbent device (e.g., Dish-1 710 and Dish-2 712). For example, when the distance between the AP 706 and the incumbent device (e.g., Dish-1 710 and Dish-2 712) is much larger when compared to a communication range for the AP 706 then the transmission power mode may be in a higher transmit power class compared to a situation in which the distance between the AP 706 and the incumbent device (e.g., Dish-1 710 and Dish-2 712) is smaller when compared to a communication range for the AP 706.

The AFC server 704 may be configured to determine the transmission power mode permission based on the uncertainty for the distance between the AP 706 and the incumbent device (e.g., Dish-1 710 and Dish-2 712). When the AP 706 has a larger location uncertainty compared to the distance between the AP 706 and the incumbent device (e.g., Dish-1 710 and Dish-2 712) and the communication range for the AP 706, then a lower transmit power class may be used when compared to a situation in which the location uncertainty between the AP 706 and the incumbent device (e.g., Dish-1 710 and Dish-2 712) is smaller when compared to the distance between the AP 706 and the incumbent device (e.g., Dish-1 710 and Dish-2 712) and the communication range for the AP 706.

The AFC server 704 may be configured to transmit the transmission power mode permission to the AP using any suitable method. In one example, the AFC server 704 may comprise a transceiver that may be configured to transmit the transmission power mode permission to the AP.

The AFC server 704 may be configured to determine the MSE using the location of the AP 706. The location of the AP 706 may be determined at the AP 706 (e.g., when the AP 706 includes global positioning system (GPS) functionality) or by using a close proximity communication device 722. The AP location may be determined periodically. Periodically determining the AP location 706 may increase the accuracy of the AP location, reduce the AP location 706 uncertainty, or the like.

The AP location may be validated based on the close proximity communication device 722 location. In one example, when the AP location is determined at the AP 706 based on, e.g., GPS located at the AP 706, the location for the close proximity communication device 722 may be used to validate the AP location, as computed using GPS, of the AP 706. When the AP location is located outdoors with a clear line of site to the sky, then the AP location as determined using GPS may be accurate and the close proximity communication device 722 location may verify that the GPS is providing accurate data when the location data received from GPS matches the location data received from the close proximity communication device 722.

In contrast, the AP location may be replaced by the location as computed using the close proximity communication device 722. When the AP location is located indoors without an adequate line of site to the sky, then the location data provided by the GPS may not be accurate or may otherwise be imprecise. The location data as provided by the close proximity communication device 722 may indicate that the location data provided by the GPS at the AP 706 is inaccurate or otherwise imprecise based on a difference between the location of the close proximity communication device and the location of the AP 706.

When the AP location may not be validated by the close proximity communication device 722 or when the close proximity communication device 722 may not provide sufficient location data to determine a location of the AP 706, then the AFC may not provide a transmission power mode permission to the AP 706. This may occur when the AFC does not have sufficient data to provide a suitable level of interference protection for incumbent communication devices (e.g., Dish-1 710 and Dish-2 712). In this situation, the AFC may continue to acquire location data for the AP to determine the location of the AP 706 to a sufficient accuracy and with a sufficient margin of error bound.

The AFC server 704 may be configure to receive AP device data from one or more of the AP 706 or the close proximity communication device 722. In one example, the AFC server 704 may be configured to an AP identifier from one or more of the AP 706 or the close proximity communication device 722. The AFC server 704 may be configured to receive any suitable device data for the AP 706 from one or more of the AP 706 or the close proximity communication device 722 including one or more of: a request identifier (e.g., RequestID), AP device description data (e.g., a serial number, a certification identifier, a rule set identifier), AP location data (e.g., elliptical location data such as center longitude, center latitude, majorAxis, minorAxis, or orientation; elevation location data such as height, height type, or vertical uncertainty; or indoor deployment data), an inquired frequency range (e.g., a low frequency and a high frequency in a frequency range in the 6 GHz frequency band), inquired channel data, or the like. In one example, the AP device data may include one or more of: a geolocation, a location confidence, an antenna height, an FCC identifier (ID), a serial number, interference data, distortion data, noise power data, environmental data, or the like.

The AFC server 704 may be configured to receive an interference level between the AP 706 and the one or more incumbent devices (e.g., Dish-1 710 and Dish-2 712) from one or more of the AP 704 or the close proximity communication device 722. In some examples, the AFC server 704 may be configured to compute an I/N ratio for the incumbent device (e.g., Dish-1 710 and Dish-2 712). In some examples, the AFC server 704 may be configured to compute one or more operating frequencies for an AP 706. The one or more operating frequencies may have an I/N ratio of less than a threshold at the incumbent device (e.g., Dish-1 710 and Dish-2 712).

The AP 706 may comprise a processing device that may be configured to determine interference between the AP 706 and one or more incumbent devices (e.g., Dish-1 710 and Dish-2 712). The AP 706 may be configured to determine a distance between the AP 706 and the one or more incumbent devices (e.g., Dish-1 710 and Dish-2 712). Determining a distance between the AP 706 and incumbent devices (e.g., Dish-1 710 and Dish-2 712) may include determining a location of the AP 706.

The AP 706 may share its location to receive permission from the AFC server 704 to perform various operations, including to use standard power WiFi transmission in the 6 GHz frequency band. To determine the location of the AP 706, a geolocation may be determined, such as by using a GPS location of the AP 706. The AP 706 may be configured to send, from the AP 706 for transmission to an AFC server 704, the AP location and receive, at the AP 706 from the AFC server 704, a transmission power mode permission (e.g., to operate in a transmit power class).

Using an integrated GPS receiver at the AP 706 may increase the cost and complexity of the AP 706. In some instances, APs 706 deployed in enterprise settings may be fixed to a particular location and that location may be communicated in conjunction with the installation or deployment of the AP 706. Integrated GPS may be eliminated to lower manufacturing costs, device complexity, and power consumption, and the coordinates may be directly communicated to the AP 706 from a close proximity communication device 722 (e.g., such as a user equipment (UE) which may include a mobile device). In some instances, determining a GPS location of an AP 706 may be difficult (e.g., when the AP 706 is indoors or otherwise does not have a clear line of sight to the sky).

The AP 706 may be configured to determine an AP location based on a location of a close proximity communication device 722. The close proximity communication device 722 may determine its own location, such as by using a GPS device, cell tower triangulation, inferring a location, inheriting a location (such as from a service provider), or the like which may be communicated to the AP 706. The close proximity communication device 722 may be configured to communicate its own location to another device (e.g., an AFC server 704) to inform that other system of the location of the AP 706. This communication from the AP 706 to the AFC server 704 to inform the system of the location of the AP may include an identifier of the AP 706.

The AP 706 may be configured to communicate data to the close proximity communication device 722 for communication to the AFC server 704. The AP 706 may be configured to send, to the close proximity communication device 722, a relay request to communicate one or more of the AP location or the AP 706 identifier to the AFC server 704. In some instances, to acquire the identifier of the AP 706, the close proximity communication device 722 may communicate with the AP 706 by establishing a connection with the AP 706 to acquire the identifier of the AP 706 directly from the AP 706. The AP 706 may broadcast: (i) the AP identifier and (ii) a request to send the AP identifier to the AFC server 704 with location information (e.g., location data). The close proximity communication device 722 may receive: (i) the broadcast with the AP identifier and (ii) the request to send the AP identifier to the AFC server 704. The close proximity communication device 722 may send the identifier of the AP 706 to a device or system identified in the request (e.g., an AFC server 704).

In some instances, for which the AP 706 may have a weak GPS signal strength, such as indoors, there may be location errors. An AP 706 may use WiFi-assisted GPS available on a close proximity communication device 722 (e.g., a mobile device) to reduce the location uncertainty (e.g., as identified by a region of uncertainty). The WiFi® signal strength of the AP 706 may be used to compute the distance between the AP 706 and the close proximity communication device 722. The location of the close proximity communication device 722 may be adjusted based on the proximity to the AP 706 to refine the AP location before the AP location is sent to the AFC server 704. The proximity computation may be computed using one or more of Wi-Fi®, NFC, Bluetooth®, Infrared, USB, or the like.

The close proximity communication device 722 may be configured to verify (e.g., on a periodic basis) a distance between the close proximity communication device 722 to the AP 706 to update its location. In some examples, the close proximity communication device 722 may be configured to adjust the AP location based on a geolocation, wherein the geolocation may be determined using one or more of a GPS, an AP fixed location, or an additional close proximity communication device location. In some cases, in which the AP 706 has an integrated GPS device, the close proximity device may be used to validate the GPS location at the AP 706. When there is a mismatch between the location provided by the GPS at the AP and the location provided by the close proximity communication device (e.g., when the location of the close proximity device is different from the GPS location of the AP), then an additional action may be performed (e.g., update the GPS location reading based on the close proximity communication device reading, ignoring the GPS location reading, or replacing the GPS reading with the location of the close proximity communication device).

The AP may be configured to determine a transmission power mode based on the power setting permission. The transmission power mode may be one or more of: (i) a non-transmitting power mode, (ii) a very low power mode, (iii) a low power mode, or (iv) a standard power mode.

APIs such as UW_API_ModemStatusGet( ) as depicted in Table III, may be used to query the microwave modem 703 to verify the real-time impact of turning on an AP 706 in the path of the microwave tower. APIs may also be implemented in OpenRAN systems.

between or near a communication channel between the incumbent systems (e.g., communication between Dish-1 710 and Dish-2 712) that may cause interference in the 6 GHz frequency band.

The AP 706 may be configured to communicate with an AFC server 704. For example, the AP 706 may be configured to transmit obtained operational data to the AFC server 706 including location data of the AP 706 to the AFC server 704. Additionally or alternatively, a close proximity communication device 722 may be configured to transmit the location data of the AP 706 to the AFC server 704.

The AP 706 may be configured to receive transmissions from the AFC server 704. The AFC server 704 may be configured to set an operation mode for the AP 706 based on the I/N ratio for the incumbent device (e.g., Dish-1 710 and Dish-2 712). The AFC server 704 may determine that transmission by the AP 706 in a standard power mode may cause an I/N ratio at an incumbent system (e.g., Dish-1 710 and Dish-2 712) to be greater than a threshold and the AFC server 704 may direct the AP 706 to broadcast in a low power mode. The MSE values may contribute to the AFC server 704 computing an I/N ratio for the incumbent device (e.g., Dish-1 710 and Dish-2 712). For example, the AFC server 704 may be configured to use MSE values from a receiver to make a determination of an I/N ratio for the one or more incumbent systems (e.g., Dish-1 710 and Dish-2 712).

The close proximity communication device 722 may comprise a transceiver and a processing device. The transceiver may be configured to receive an AP identifier from an AP 706. The processing device may be configured to determine a close proximity communication device 722 location. The close proximity communication device 722 location may be determined using one or more of a GPS, triangulation, a service provider communication, or the like. The AP location variance may be reduced using the close proximity communication device location to adjust the AP location. The AP location variance may be decreased based on an AP signal strength.

TABLE III

| UW_MODEM_STATUS_STRUCT | | | |
| --- | --- | --- | --- |
| Field Name | Type | Value Range | Description |
| acquireStatus | BYTE | UW_ACQUIRE_STATUS_ENUM | Link acquire status. |
| lastAcquireError | BYTE | UW_ACQUIRE_ERR_ENUM | Last acquire error. |
| absoluteMseTenths | INT16 | In 0.1 dB steps 0 [tenth dB] to −600 [tenth dB] | Absolute MSE. |
| normalizedMseTenths | INT16 | In 0.1 dB steps 0 [tenth dB] to −600 [tenth dB] | Normalized MSE. |
| radialMseTenths | INT16 | In 0.1 dB steps 0 [tenth dB] to −600 [tenth dB] | Radial MSE. |
| internalAgc | INT16 | In 0.1 dB steps 0 [tenth dB] to −600 [tenth dB] | Internal automatic gain control (AGC). |
| externalAgcRegister | UINT16 | Directly reflects HW register | External AGC. |
| carrierOffset | INT32 | In Hz, range [−1e6 to 1e6] | Carrier Offset |

The AP 706 may be located in a path between two incumbent systems (e.g., communication between Dish-1 710 and Dish-2 712). The AP 706 may be configured to broadcast communications, such as 6 GHz communications to one or more devices that may be communicatively coupled to the AP 706.

Two incumbent systems (e.g., Dish-1 710 and Dish-2 712) may be configured to send or receive transmissions which may include communications in the 6 GHz frequency band. An AP 706 may be configured to broadcast communications in the 6 GHz frequency band which may be disposed The close proximity communication device 722 may be configured to determine a distance between the close proximity communication device 722 and an AP 706 (which may be determined on a periodic basis). The close proximity communication device 722 may be configured to determine an AP location based on the close proximity communication device location and the distance between the close proximity communication device 722 and the AP 706. The transceiver for the close proximity communication device 722 may be configured to transmit one or more of the AP identifier or the AP location to an automatic frequency coordination (AFC)

server 704, The transceiver may be configured to communicate using one or more of near field communication (NFC), Bluetooth, infrared, a universal serial bus standard, or the like.

The close proximity communication device 722 may be configured to receive a relay request to communicate one or more of the AP location or the AP identifier to the AFC server 704.

Figure 8:
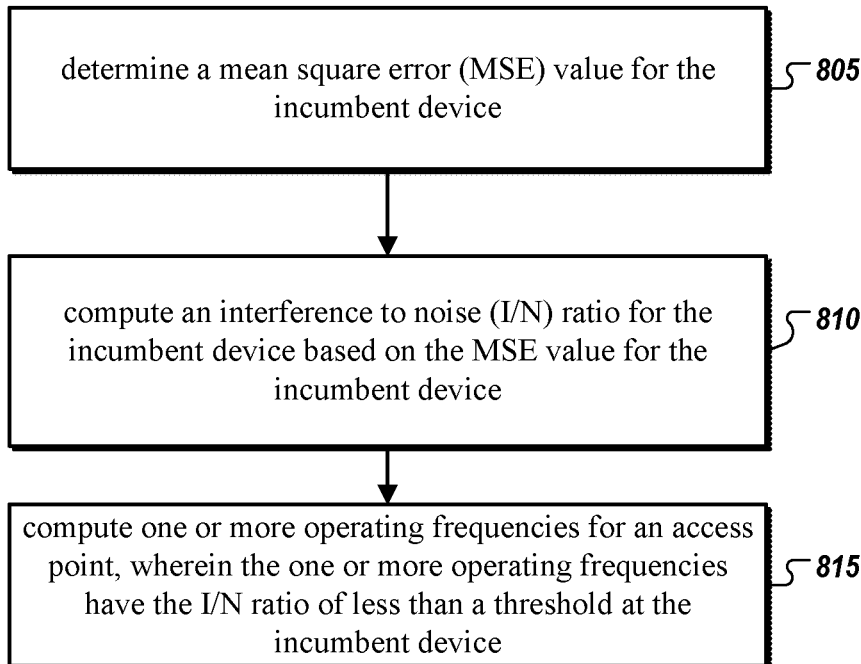
FIG. 8 illustrates an example process flow of an AFC server.

FIG. 8 illustrates a process flow of an example method 800 of automatic frequency coordination, in accordance with at least one embodiment described in the present disclosure. The method 800 may be arranged in accordance with at least one embodiment described in the present disclosure.

Figure 14:
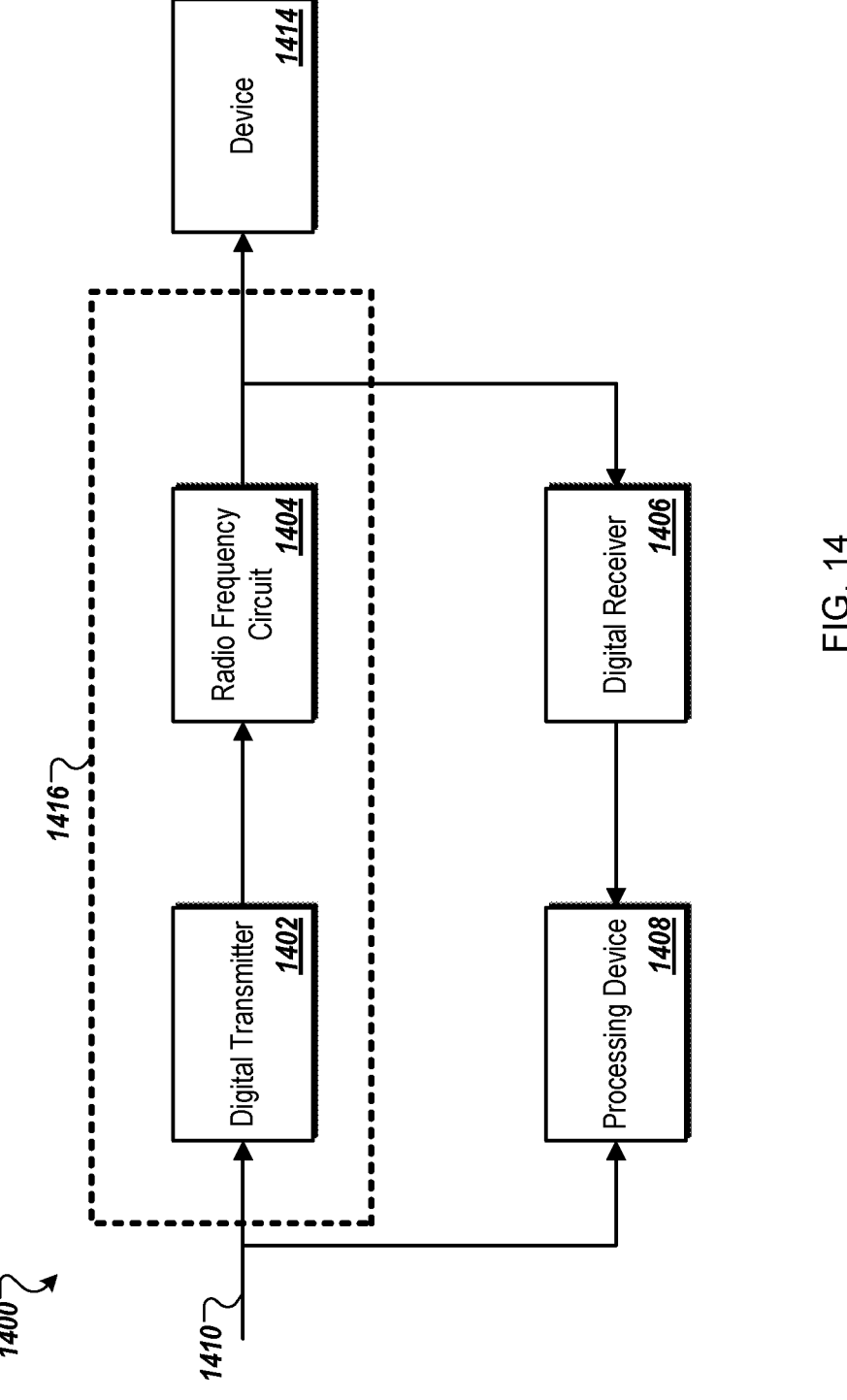
FIG. 14 illustrates an example communication system configured for automatic frequency coordination.
Figure 15:
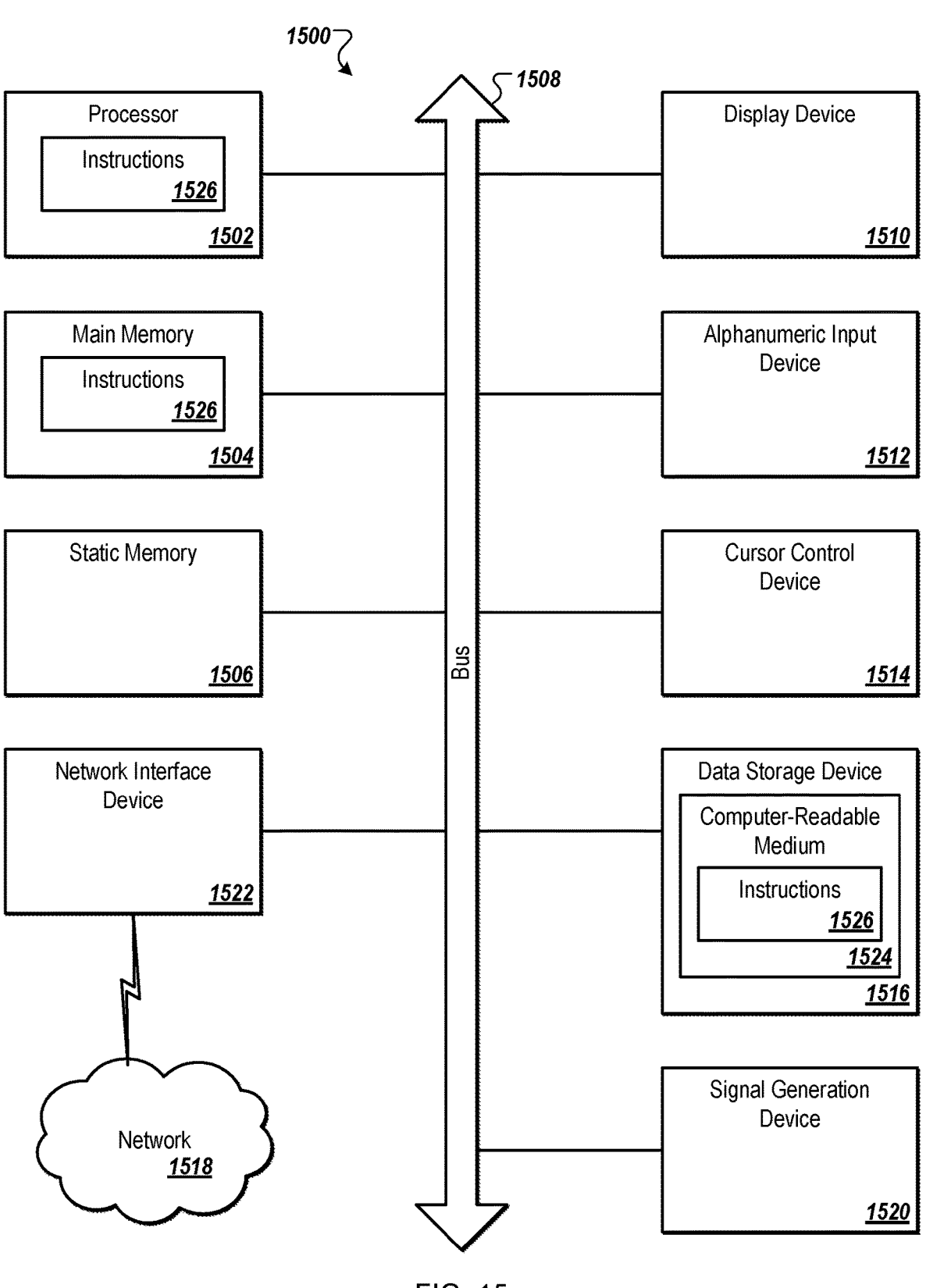
FIG. 15 illustrates a diagrammatic representation of a machine in the example form of a computing device within which a set of instructions, for causing the machine to perform any one or more of the methods discussed herein, may be executed.

The method 800 may be performed by processing logic that may include hardware (circuitry, dedicated logic, etc.), software (such as is run on a computer system or a dedicated machine), or a combination of both, which processing logic may be included in the processor 1502 of FIG. 15, the communication system 1400 of FIG. 14, or another device, combination of devices, or systems.

The method 800 may begin at block 805 where the processing logic may determine a mean square error (MSE) value for the incumbent device.

At block 810, the processing logic may compute an interference to noise (I/N) ratio for the incumbent device based on the MSE value for the incumbent device.

At block 815, the processing logic may compute one or more operating frequencies for an access point, wherein the one or more operating frequencies have the I/N ratio of less than a threshold at the incumbent device.

Modifications, additions, or omissions may be made to the method 800 without departing from the scope of the present disclosure. For example, in some embodiments, the method 800 may include any number of other components that may not be explicitly illustrated or described.

Figure 9:
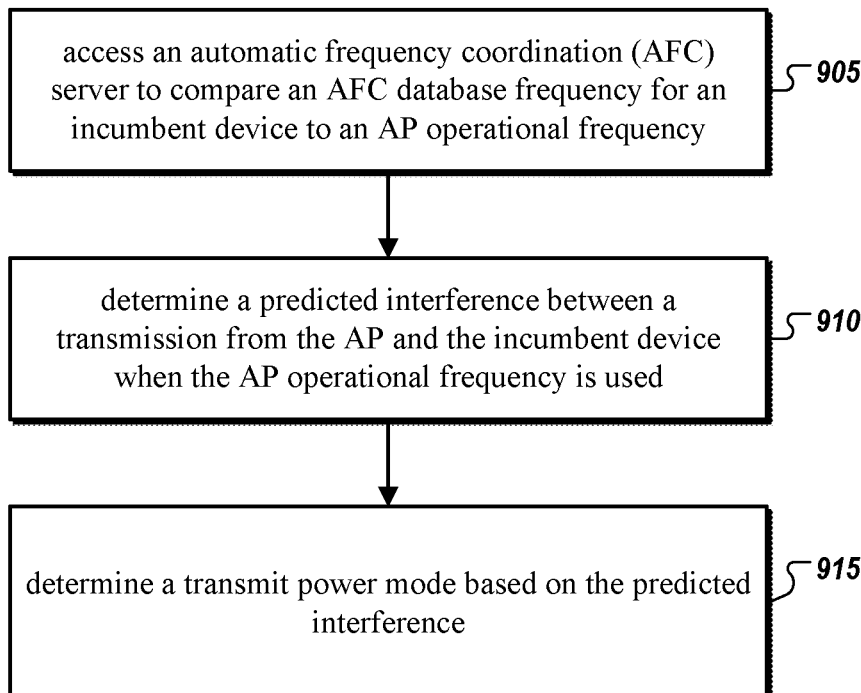
FIG. 9 illustrates an example process flow of an access point.

FIG. 9 illustrates a process flow of an example method 900 that may be used for automatic frequency coordination, in accordance with at least one embodiment described in the present disclosure. The method 900 may be arranged in accordance with at least one embodiment described in the present disclosure.

The method 900 may be performed by processing logic that may include hardware (circuitry, dedicated logic, etc.), software (such as is run on a computer system or a dedicated machine), or a combination of both, which processing logic may be included in the processing device 1502 of FIG. 15, the communication system 1400 of FIG. 14, or another device, combination of devices, or systems.

The method 900 may begin at block 905 where the processing logic may access an automatic frequency coordination (AFC) server to compare an AFC database frequency for an incumbent device to an AP operational frequency.

At block 910, the processing logic may determine a predicted interference between a transmission from the AP and the incumbent device when the AP operational frequency is used.

At block 915, the processing logic may determine a power mode based on the predicted interference.

Modifications, additions, or omissions may be made to the method 900 without departing from the scope of the present disclosure. For example, in some embodiments, the method 900 may include any number of other components that may not be explicitly illustrated or described.

FIG. 10 illustrates a process flow of an example method 1000 that may be used for automatic frequency coordination, in accordance with at least one embodiment described in the present disclosure. The method 1000 may be arranged in accordance with at least one embodiment described in the present disclosure.

The method 1000 may be performed by processing logic that may include hardware (circuitry, dedicated logic, etc.), software (such as is run on a computer system or a dedicated machine), or a combination of both, which processing logic may be included in the processing device 1502 of FIG. 15, the communication system 1400 of FIG. 14, or another device, combination of devices, or systems.

The method 1000 may begin at block 1005 where the processing logic may receive one or more operational characteristics from an incumbent device.

At block 1010, the processing logic may estimate a mean square error (MSE) at the incumbent device based on the one or more operational characteristics for the incumbent device.

At block 1015, the processing logic may compute a threshold MSE for the incumbent device based on a modulation type.

At block 1020, the processing logic may select an operating frequency based on the MSE at the incumbent device and the threshold MSE for the incumbent device. query a modem using an API to determine an activation difference for an access point. The processing logic may be configured to one or more of: receive the MSE in real-time, obtain the MSE in real-time, compute the MSE in real-time, or verify the MSE in real-time.

The processing logic may be configured to switch from a standard power mode to a low power mode when the MSE is greater than a threshold for the standard power mode and less than a threshold for the low power mode. The processing logic may be configured to switch from a low power mode to a very low power mode when the MSE is greater than a threshold for the low power mode and less than a threshold for the very low power mode. The processing logic may be configured to switch from a very low power mode to an inactive mode when the MSE is greater than a threshold for the very low power mode.

The processing logic may be configured to compute an I/N ratio for the incumbent device. In one example, the processing logic may be configured to compute the I/N ratio for the incumbent device based on the MSE value for the incumbent device.

The processing logic may be configured to compute a link quality for one or more of the AP or the incumbent device. In one example, the processing logic may be configured to compute a link quality based on one or more of the MSE value, the MSE threshold, or the modulation type.

Modifications, additions, or omissions may be made to the method 1000 without departing from the scope of the present disclosure. For example, in some embodiments, the method 1000 may include any number of other components that may not be explicitly illustrated or described.

Figure 11:
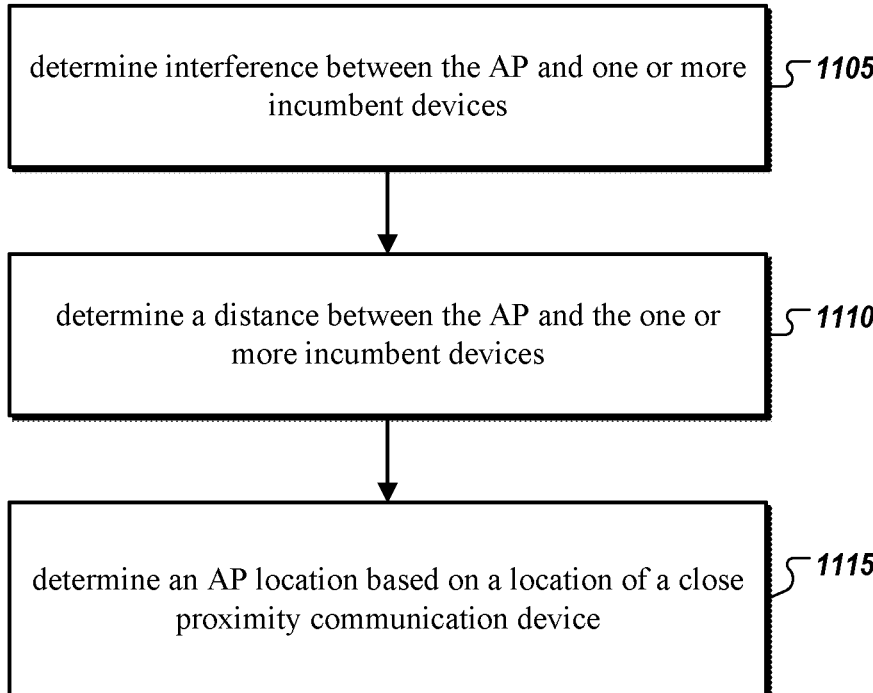
FIG. 11 illustrates an example process flow of an access point.

FIG. 11 illustrates a process flow of an example method 1100 that may be used for automatic frequency coordination, in accordance with at least one embodiment described in the present disclosure. The method 1100 may be arranged in accordance with at least one embodiment described in the present disclosure.

The method 1100 may be performed by processing logic that may include hardware (circuitry, dedicated logic, etc.), software (such as is run on a computer system or a dedicated machine), or a combination of both, which processing logic may be included in the processing device 1502 of FIG. 15, the communication system 1400 of FIG. 14, or another device, combination of devices, or systems.

The method 1100 may begin at block 1105 where the processing logic may determine interference between the AP and one or more incumbent devices.

At block 1110, the processing logic may determine a distance between the AP and the one or more incumbent devices At block 1115, the processing logic may determine an AP location based on a location of a close proximity communication device Modifications, additions, or omissions may be made to the method 1100 without departing from the scope of the present disclosure. For example, in some embodiments, the method 1100 may include any number of other components that may not be explicitly illustrated or described.

Figure 12:
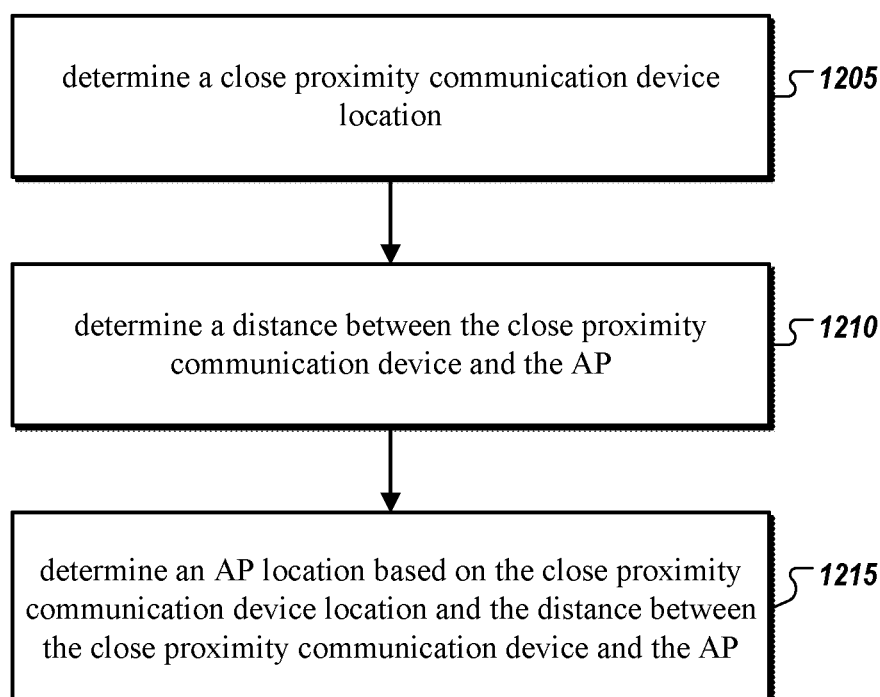
FIG. 12 illustrates an example process flow of a close proximity communication device.

FIG. 12 illustrates a process flow of an example method 1200 that may be used for automatic frequency coordination, in accordance with at least one embodiment described in the present disclosure. The method 1200 may be arranged in accordance with at least one embodiment described in the present disclosure.

The method 1200 may be performed by processing logic that may include hardware (circuitry, dedicated logic, etc.), software (such as is run on a computer system or a dedicated machine), or a combination of both, which processing logic may be included in the processing device 1502 of FIG. 15, the communication system 1400 of FIG. 14, or another device, combination of devices, or systems.

The method 1200 may begin at block 1205 where the processing logic may determine a close proximity communication device location.

At block 1210, the processing logic may determine a distance between the close proximity communication device and the AP.

At block 1215, the processing logic may determine an AP location based on the close proximity communication device location and the distance between the close proximity communication device and the AP.

Modifications, additions, or omissions may be made to the method 1200 without departing from the scope of the present disclosure. For example, in some embodiments, the method 1200 may include any number of other components that may not be explicitly illustrated or described.

Figure 13:
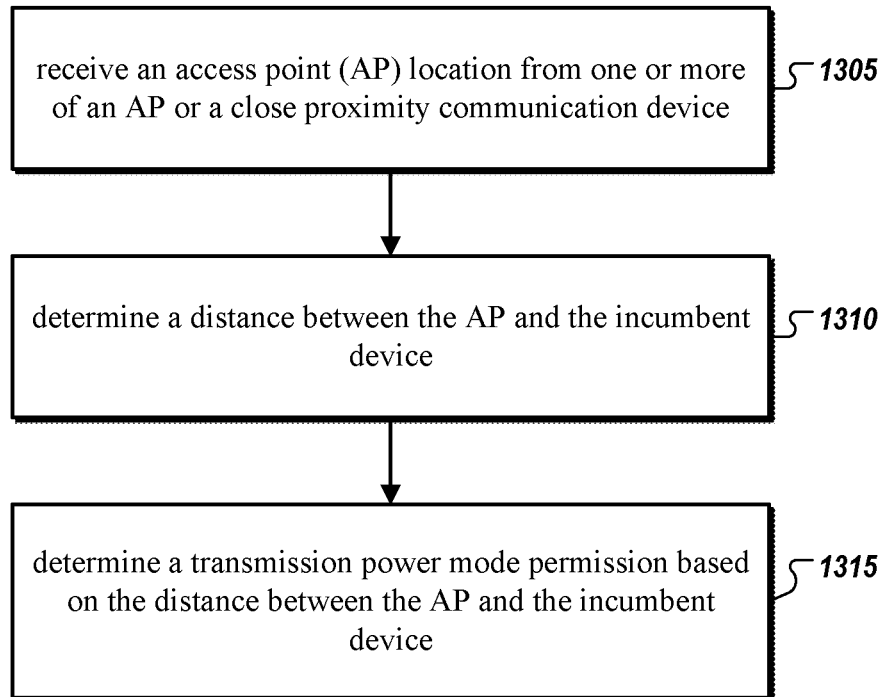
FIG. 13 illustrates an example process flow for an AFC server.

FIG. 13 illustrates a process flow of an example method 1300 that may be used for automatic frequency coordination, in accordance with at least one embodiment described in the present disclosure. The method 1300 may be arranged in accordance with at least one embodiment described in the present disclosure.

The method 1300 may be performed by processing logic that may include hardware (circuitry, dedicated logic, etc.), software (such as is run on a computer system or a dedicated machine), or a combination of both, which processing logic may be included in the processing device 1502 of FIG. 15, the communication system 1400 of FIG. 14, or another device, combination of devices, or systems.

The method 1300 may begin at block 1305 where the processing logic may receive an access point (AP) location from one or more of an AP or a close proximity communication device.

At block 1310, the processing logic may determine a distance between the AP and the incumbent device.

At block 1315, the processing logic may determine a transmission power mode permission based on the distance between the AP and the incumbent device.

Modifications, additions, or omissions may be made to the method 1300 without departing from the scope of the present disclosure. For example, in some embodiments, the method 1300 may include any number of other components that may not be explicitly illustrated or described.

For simplicity of explanation, methods and/or process flows described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 14 illustrates a block diagram of an example communication system 1400 configured for one or more automatic frequency coordination or AP location determination, in accordance with at least one embodiment described in the present disclosure. The communication system 1400 may include a digital transmitter 1402, a radio frequency circuit 1404, a device 1414, a digital receiver 1406, and a processing device 1408. The digital transmitter 1402 and the processing device may be configured to receive a baseband signal via connection 1410. A transceiver 1416 may comprise the digital transmitter 1402 and the radio frequency circuit 1404.

In some embodiments, the communication system 1400 may include a system of devices that may be configured to communicate with one another via a wired or wireline connection. For example, a wired connection in the communication system 1400 may include one or more Ethernet cables, one or more fiber-optic cables, and/or other similar wired communication mediums. Alternatively, or additionally, the communication system 1400 may include a system of devices that may be configured to communicate via one or more wireless connections. For example, the communication system 1400 may include one or more devices configured to transmit and/or receive radio waves, microwaves, ultrasonic waves, optical waves, electromagnetic induction, and/or similar wireless communications. Alternatively, or additionally, the communication system 1400 may include combinations of wireless and/or wired connections. In these and other embodiments, the communication system 1400 may include one or more devices that may be configured to obtain a baseband signal, perform one or more operations to the baseband signal to generate a modified baseband signal, and transmit the modified baseband signal, such as to one or more loads.

In some embodiments, the communication system 1400 may include one or more communication channels that may communicatively couple systems and/or devices included in the communication system 1400. For example, the transceiver 1416 may be communicatively coupled to the device 1414.

In some embodiments, the transceiver 1416 may be configured to obtain a baseband signal. For example, as described herein, the transceiver 1416 may be configured to generate a baseband signal and/or receive a baseband signal from another device. In some embodiments, the transceiver 1416 may be configured to transmit the baseband signal. For example, upon obtaining the baseband signal, the transceiver 1416 may be configured to transmit the baseband signal to a separate device, such as the device 1414. Alternatively, or additionally, the transceiver 1416 may be configured to modify, condition, and/or transform the baseband signal in advance of transmitting the baseband signal. For example, the transceiver 1416 may include a quadrature up-converter and/or a digital to analog converter (DAC) that may be configured to modify the baseband signal. Alternatively, or additionally, the transceiver 1416 may include a direct RF sampling converter that may be configured to modify the baseband signal.

In some embodiments, the digital transmitter 1402 may be configured to obtain a baseband signal via connection 1410. In some embodiments, the digital transmitter 1402 may be configured to up-convert the baseband signal. For example, the digital transmitter 1402 may include a quadrature up-converter to apply to the baseband signal. In some embodiments, the digital transmitter 1402 may include an integrated digital to analog converter (DAC). The DAC may convert the baseband signal to an analog signal, or a continuous time signal. In some embodiments, the DAC architecture may include a direct RF sampling DAC. In some embodiments, the DAC may be a separate element from the digital transmitter 1402.

In some embodiments, the transceiver 1416 may include one or more subcomponents that may be used in preparing the baseband signal and/or transmitting the baseband signal. For example, the transceiver 1416 may include an RF front end (e.g., in a wireless environment) which may include a power amplifier (PA), a digital transmitter (e.g., 1402), a digital front end, an IEEE 1588v2 device, a Long-Term Evolution (LTE) physical layer (L-PHY), an (S-plane) device, a management plane (M-plane) device, an Ethernet media access control (MAC)/personal communications service (PCS), a resource controller/scheduler, and the like. In some embodiments, a radio (e.g., a radio frequency circuit 1404) of the transceiver 1416 may be synchronized with the resource controller via the S-plane device, which may contribute to high-accuracy timing with respect to a reference clock.

In some embodiments, the transceiver 1416 may be configured to obtain the baseband signal for transmission. For example, the transceiver 1416 may receive the baseband signal from a separate device, such as a signal generator. For example, the baseband signal may come from a transducer configured to convert a variable into an electrical signal, such as an audio signal output of a microphone picking up a speaker's voice. Alternatively, or additionally, the transceiver 1416 may be configured to generate a baseband signal for transmission. In these and other embodiments, the transceiver 1416 may be configured to transmit the baseband signal to another device, such as the device 1414.

In some embodiments, the device 1414 may be configured to receive a transmission from the transceiver 1416. For example, the transceiver 1416 may be configured to transmit a baseband signal to the device 1414.

In some embodiments, the radio frequency circuit 1404 may be configured to transmit the digital signal received from the digital transmitter 1402. In some embodiments, the radio frequency circuit 1404 may be configured to transmit the digital signal to the device 1414 and/or the digital receiver 1406. In some embodiments, the digital receiver 1406 may be configured to receive a digital signal from the RF circuit and/or send a digital signal to the processing device 1408.

In some embodiments, the processing device 1408 may be a standalone device or system, as illustrated. Alternatively, or additionally, the processing device 1408 may be a component of another device and/or system. For example, in some embodiments, the processing device 1408 may be included in the transceiver 1416. In instances in which the processing device 1408 is a standalone device or system, the processing device 1408 may be configured to communicate with additional devices and/or systems remote from the processing device 1408, such as the transceiver 1416 and/or the device 1414. For example, the processing device 1408 may be configured to send and/or receive transmissions from the transceiver 1416 and/or the device 1414. In some embodiments, the processing device 1408 may be combined with other elements of the communication system 1400.

FIG. 15 illustrates a diagrammatic representation of a machine in the example form of a computing device 1500 within which a set of instructions, for causing the machine to perform any one or more of the methods discussed herein, may be executed. The computing system may be configured to implement or direct one or more operations associated with an interference estimator, MSE estimator, an AP location determiner (on an AP or on a close proximity device), or multi-link devices managing multicast communications. The computing device 1500 may include a rackmount server, a router computer, a server computer, a mainframe computer, a laptop computer, a tablet computer, a desktop computer, or any computing device with at least one processor, etc., within which a set of instructions, for causing the machine to perform any one or more of the methods discussed herein, may be executed. In alternative embodiments, the machine may be connected (e.g., networked) to other machines in a local area network (LAN), an intranet, an extranet, or the Internet. The machine may operate in the capacity of a server machine in client-server network environment. Further, while only a single machine is illustrated, the term "machine" may also include any collection of machines that individually or jointly execute a set (or multiple sets) of instructions to perform any one or more of the methods discussed herein.

The example computing device 1500 includes a processing device (e.g., a processor) 1502, a main memory 1504 (e.g., read-only memory (ROM), flash memory, dynamic random access memory (DRAM) such as synchronous DRAM (SDRAM)), a static memory 1506 (e.g., flash memory, static random access memory (SRAM)) and a data storage device 1516, which communicate with each other via a bus 1508.

Processing device 1502 represents one or more general-purpose processing devices such as a microprocessor, central processing unit, or the like. More particularly, the processing device 1502 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1502 may also include one or more special-purpose processing devices such as an application specific integrated circuit (ASIC), a field programmable gate array (FPGA), a digital signal processor (DSP), network processor, or the like. The processing device 1502 is configured to execute instructions 1526 for performing the operations and steps discussed herein.

The computing device 1500 may further include a network interface device 1522 which may communicate with a network 1518. The computing device 1500 also may include a display device 1510 (e.g., a liquid crystal display (LCD) or a cathode ray tube (CRT)), an alphanumeric input device 1512 (e.g., a keyboard), a cursor control device 1514 (e.g., a mouse) and a signal generation device 1520 (e.g., a speaker). In at least one embodiment, the display device 1510, the alphanumeric input device 1512, and the cursor control device 1514 may be combined into a single component or device (e.g., an LCD touch screen).

The data storage device 1516 may include a computer-readable storage medium 1524 on which is stored one or more sets of instructions 1526 embodying any one or more of the methods or functions described herein. The instructions 1526 may also reside, completely or at least partially, within the main memory 1504 and/or within the processing device 1502 during execution thereof by the computing device 1500, the main memory 1504 and the processing device 1502 also constituting computer-readable media. The instructions may further be transmitted or received over a network 1518 via the network interface device 1522.

While the computer-readable storage medium 1524 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not limited to, solid-state memories, optical media and magnetic media.

In some embodiments, the different components, modules, engines, and services described herein may be implemented as objects or processes that execute on a computing system (e.g., as separate threads). While some of the systems and methods described herein are generally described as being implemented in software (stored on and/or executed by hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. An access point (AP), comprising:
    a processing device configured to:
        access an automatic frequency coordination (AFC) server to compare an AFC database frequency for an incumbent device to an AP operational frequency;
        determine a predicted interference between a transmission from the AP and the incumbent device when the AP operational frequency is used;
        defer transmission until an operating-mode permission is received from the AFC server based on a validated AP location that includes location input relayed by a close-proximity communication device;
        determine a power mode based on the predicted interference; and
    a transceiver configured to:
        transmit a signal on the AP operational frequency at the power mode.

2. The access point of claim 1, wherein the AP is in an incumbent transmission path.

3. The access point of claim 1, wherein the AP is configured to transmit operational data to the AFC server.

4. The access point of claim 1, wherein the AP is configured to transmit on the AP operational frequency that is selected from the group consisting of: an Unlicensed National Information Infrastructure (UNII)-5 frequency band, a UNII-6 frequency band, a UNII-7 frequency band, or a UNII-8 frequency band.

5. The access point of claim 1, wherein the power mode includes one or more of: a standard power mode, a low power mode, or a very low power mode.

6. The access point of claim 1, wherein the power mode is selected to facilitate the predicted interference of less than a predicted interference-to-noise (I/N) ratio of less than-6 dB.

7. A non-transitory computer-readable storage medium including computer executable instructions that, when executed by one or more processors, cause an automatic frequency coordination (AFC) server to:

receive one or more operational characteristics from an incumbent device;

attempt to validate an AP location using a close-proximity communication device and defer selecting operating frequencies when validation is insufficient;

estimate an error value at the incumbent device based on the one or more operational characteristics for the incumbent device;

compute a threshold error value for the incumbent device based on a modulation type; and select an operating frequency that satisfies an interference-to-noise (I/N) threshold at the incumbent device, wherein the server is to apply a protective margin to a link-budget I/N calculation based on the error value at the incumbent device and the threshold error value for the incumbent device.

8. The non-transitory computer-readable storage medium of claim 7, wherein the instructions, when executed by the one or more processors, further cause the AFC server to:

query a modem using an application protocol interface (API) to determine an activation difference for an access point.

9. The non-transitory computer-readable storage medium of claim 7, wherein the instructions, when executed by the one or more processors, further cause the AFC server to:

switch from a standard power mode to a low power mode when the error value is greater than a threshold for the standard power mode and less than a threshold for the low power mode;

switch from a low power mode to a very low power mode when the error value is greater than a threshold for the low power mode and less than a threshold for the very low power mode; and switch from a very low power mode to an inactive mode when the error value is greater than a threshold for the very low power mode.

10. The non-transitory computer-readable storage medium of claim 7, wherein the instructions, when executed by the one or more processors, further cause the AFC server to:

compute an interference to noise (I/N) ratio for the incumbent device based on the error value for the incumbent device.

11. The non-transitory computer-readable storage medium of claim 7, wherein the instructions, when executed by the one or more processors, further cause the AFC server to:

compute a link quality based on the error value, the error value threshold, and the modulation type.

12. The non-transitory computer-readable storage medium of claim 7, wherein the instructions, when executed by the one or more processors, further cause the AFC server to:

receive the error value in real-time;

obtain the error value in real-time;

compute the error value in real-time; or verify the error value in real-time.

13. A method performed by an access point (AP), the method comprising:

accessing an automatic frequency coordination (AFC) server to compare an AFC database frequency for an incumbent device to an AP operational frequency;

determining a predicted interference between a transmission from the AP and the incumbent device when the AP operational frequency is used;

deferring transmission until an operating-mode permission is received from the AFC server based on a validated AP location that includes location input relayed by a close-proximity communication device;

determining a power mode based on the predicted interference; and transmitting a signal on the AP operational frequency at the power mode.

14. The method of claim 13, wherein the AP is in an incumbent transmission path.

15. The method of claim 13, wherein the AP is configured to transmit operational data to the AFC server.

16. The method of claim 13, wherein the AP is configured to transmit on the AP operational frequency that is selected from the group consisting of: an Unlicensed National Information Infrastructure (UNII)-5 frequency band, a UNII-6 frequency band, a UNII-7 frequency band, or a UNII-8 frequency band.

17. The method of claim 13, wherein the power mode includes one or more of: a standard power mode, a low power mode, or a very low power mode.

18. The method of claim 13, wherein the power mode is selected to facilitate the predicted interference of less than a predicted interference-to-noise (I/N) ratio of less than −6 dB.

* * * * *